US010225065B2

(12) United States Patent
Ang et al.

(10) Patent No.: US 10,225,065 B2
(45) Date of Patent: Mar. 5, 2019

(54) COMMON CONTROL CHANNEL SUBBAND DESIGN AND SIGNALING

(71) Applicant: QUALCOMM Incorporated, San Diego, CA (US)

(72) Inventors: Peter Pui Lok Ang, San Diego, CA (US); Tao Luo, San Diego, CA (US); Wei Zeng, San Diego, CA (US); Joseph Binamira Soriaga, San Diego, CA (US); Tingfang Ji, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/268,450

(22) Filed: Sep. 16, 2016

(65) Prior Publication Data

US 2017/0181149 A1 Jun. 22, 2017

Related U.S. Application Data

(60) Provisional application No. 62/269,853, filed on Dec. 18, 2015.

(51) Int. Cl.
*H04L 5/00* (2006.01)

(52) U.S. Cl.
CPC ............ *H04L 5/0094* (2013.01); *H04L 5/003* (2013.01); *H04L 5/001* (2013.01); *H04L 5/0039* (2013.01);
(Continued)

(58) Field of Classification Search
CPC ............................. H01L 5/0004; H01L 5/003
See application file for complete search history.

(56) References Cited

U.S. PATENT DOCUMENTS

| 8,363,606 | B2 | 1/2013 | Montojo et al. |
| 2007/0165731 | A1* | 7/2007 | Xiao ..................... H04L 5/0037 375/260 |

(Continued)

FOREIGN PATENT DOCUMENTS

| EP | 2765801 A1 | 8/2014 |
| EP | 2830378 A1 | 1/2015 |

OTHER PUBLICATIONS

3GPP, "3rd Generation Partnership Project; Technical Specification Group Radio Access Network; Evolved Universal Terrestrial Radio Access (EUTRA); Physical Channels and Modulation (Release 12)", 3GPP Technical Specification, Sep. 22, 2015, 136 pgs, 3GPP TS 36.211, V12.7.0, XP050996213, 3rd Generation Partnership Project, Sophia-Antipolis Cedex, France. [retrieved on Sep. 22, 2015].

(Continued)

*Primary Examiner* — Gary Mui
(74) *Attorney, Agent, or Firm* — Holland & Hart LLP

(57) ABSTRACT

Methods, systems, and devices for wireless communication are described. A base station may transmit control information using a narrowband common control region that occupies a portion of a system bandwidth. In some cases, data may be multiplexed during the same time period in tones that are not used by the common control region. The base station may transmit control region configuration information to one or more user equipment (UE) devices such as the bandwidth, central frequency, and multiplexing status of the common control region. In some cases, the common control region may be divided into subbands, and different UEs may be assigned to monitor different subbands. Unassigned UEs may monitor a default anchor subband.

30 Claims, 19 Drawing Sheets

(52) U.S. Cl.
CPC .......... *H04L 5/0044* (2013.01); *H04L 5/0048* (2013.01); *H04L 5/0053* (2013.01); *H04L 5/0064* (2013.01); *H04L 5/0087* (2013.01)

(56) References Cited

U.S. PATENT DOCUMENTS

| | | | | |
|---|---|---|---|---|
| 2008/0009294 | A1* | 1/2008 | Cho | H04W 72/042 |
| | | | | 455/451 |
| 2008/0095122 | A1* | 4/2008 | Khandekar | H04B 7/2637 |
| | | | | 370/335 |
| 2011/0177807 | A1* | 7/2011 | Cho | H04W 56/00 |
| | | | | 455/422.1 |
| 2011/0261768 | A1* | 10/2011 | Luo | H04L 5/001 |
| | | | | 370/329 |
| 2013/0322363 | A1* | 12/2013 | Chen | H04W 72/042 |
| | | | | 370/329 |
| 2014/0241234 | A1* | 8/2014 | Zhu | H04W 72/005 |
| | | | | 370/312 |
| 2015/0009939 | A1* | 1/2015 | Zhang | H04W 72/1289 |
| | | | | 370/329 |
| 2015/0373721 | A1* | 12/2015 | Zhang | H04L 5/0057 |
| | | | | 370/329 |

OTHER PUBLICATIONS

ISA/EP, International Search Report and Written Opinion of the International Searching Authority, Int'l Application No. PCT/US2016/065731, dated Mar. 9, 2017, European Patent Office, Rijswijk, NL, 16 pgs.

Smee, "*5G Vision and Design*", IEEE 5G Summit Silicon Valley, dated Nov. 16, 2015, 22 pgs.

\* cited by examiner

COMMON CONTROL CHANNEL SUBBAND DESIGN AND SIGNALING

CROSS REFERENCES

The present Application for Patent claims priority to U.S. Provisional Patent Application No. 62/269,853 by Ang, et al., entitled "Common Control Channel Subband Design And Signaling," filed Dec. 18, 2015, assigned to the assignee hereof.

INTRODUCTION

The following relates generally to wireless communication, and more specifically to narrowband common control channel subband design and signaling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

In some cases, a base station may transmit control information to a UE using wireless resources in a common control region. However, the amount of control information to be transmitted may not occupy the entire bandwidth of a carrier. Furthermore, changing the duration of the control region may result in additional processing complexity. Thus, transmitting the control region across the entire band may result in reduced throughput or increased processing and power consumption.

SUMMARY

A method of wireless communication is described. The method may include receiving control region information comprising an indication of a bandwidth and associated frequency-time numerology (e.g., subcarrier spacing and symbol period) of a common control region, or a central frequency of the common control region, or a data multiplexing indication, the bandwidth of the common control region comprising at least a portion of a system bandwidth and monitoring the common control region based at least in part on the control region information.

An apparatus for wireless communication is described. The apparatus may include means for receiving control region information comprising an indication of a bandwidth and associated frequency-time numerology of a common control region, or a central frequency of the common control region, or a data multiplexing indication, the bandwidth of the common control region comprising at least a portion of a system bandwidth and means for monitoring the common control region based at least in part on the control region information.

A further apparatus is described. The apparatus may include a processor, memory in electronic communication with the processor, and instructions stored in the memory. The instructions may be operable to cause the processor to receive control region information comprising an indication of a bandwidth and associated frequency-time numerology of a common control region, or a central frequency of the common control region, or a data multiplexing indication, the bandwidth of the common control region comprising at least a portion of a system bandwidth and monitor the common control region based at least in part on the control region information.

A non-transitory computer readable medium for wireless communication is described. The non-transitory computer-readable medium may include instructions to cause a processor to receive control region information comprising an indication of a bandwidth and associated frequency-time numerology of a common control region, or a central frequency of the common control region, or a data multiplexing indication, the bandwidth of the common control region comprising at least a portion of a system bandwidth and monitor the common control region based on the control region information.

Some examples of the method, apparatus, or non-transitory computer-readable medium described above may further include processes, features, means, or instructions for receiving user data during a symbol period of the common control region based on the data multiplexing indication, where the user data is received using a portion of the system bandwidth that is different from the bandwidth of the common control region. In some cases, the symbol period comprises a first symbol period, a second symbol period, a third symbol period, or a fourth symbol period of a subframe and the different portion of the system bandwidth comprises a bandwidth narrower than the bandwidth of the common control region. The data multiplexing indication may include information specifying the control region and data region. For example, the data multiplexing indication may include information that describes the range of subcarriers allocated for the control region or data region (e.g., for a given UE or for multiple UEs).

In some examples of the method, apparatus, or non-transitory computer-readable medium described above, the control region information is received in a broadcast message or a common control channel (CCCH). The broadcast message may be part of a logical channel such as a master information block (MIB) and/or system information block (SIB), carried on a physical broadcast channel (PBCH). Some examples of the method, apparatus, or non-transitory computer-readable medium described above may further include processes, features, means, or instructions for receiving a common control region update message.

In some examples of the method, apparatus, or non-transitory computer-readable medium described above, the common control region update message is received using a UE specific control channel or a radio resource control (RRC) configuration message. In some examples of the method, apparatus, or non-transitory computer-readable medium described above, monitoring the common control region comprises: monitoring an anchor subband of the common control region.

In some examples of the method, apparatus, or non-transitory computer-readable medium described above, the control region information comprises a location of the anchor subband. In some examples of the method, apparatus, or non-transitory computer-readable medium described above, the control region information comprises an indication of a number of control region subbands, a bandwidth for each of the number of control region subbands, a frequency for each of the number of control region subbands, or any combination thereof.

Some examples of the method, apparatus, or non-transitory computer-readable medium described above may further include processes, features, means, or instructions for receiving an assignment message indicating a subband of the common control region. Some examples of the method, apparatus, or non-transitory computer-readable medium described above may further include processes, features, means, or instructions for monitoring the subband based on the control region subband assignment.

A method of wireless communication is described. The method may include transmitting control region information comprising an indication of a bandwidth and associated frequency-time numerology of a common control region, a central frequency of the common control region, or a data multiplexing indication, the bandwidth of the common control region comprising at least a portion of a system bandwidth and transmitting control information to at least one UE using the common control region.

An apparatus for wireless communication is described. The apparatus may include means for transmitting control region information comprising an indication of a bandwidth and associated frequency-time numerology of a common control region, a central frequency of the common control region, or a data multiplexing indication, the bandwidth of the common control region comprising at least a portion of a system bandwidth and means for transmitting control information to at least one UE using the common control region.

A further apparatus is described. The apparatus may include a processor, memory in electronic communication with the processor, and instructions stored in the memory. The instructions may be operable to cause the processor to transmit control region information comprising an indication of a bandwidth and associated frequency-time numerology of a common control region, a central frequency of the common control region, or a data multiplexing indication, the bandwidth of the common control region comprising at least a portion of a system bandwidth and transmit control information to at least one UE using the common control region.

A non-transitory computer readable medium for wireless communication is described. The non-transitory computer-readable medium may include instructions to cause a processor to transmit control region information comprising an indication of a bandwidth and associated frequency-time numerology of a common control region, a central frequency of the common control region, or a data multiplexing indication, the bandwidth of the common control region comprising at least a portion of a system bandwidth and transmit control information to at least one UE using the common control region.

Some examples of the method, apparatus, or non-transitory computer-readable medium described above may further include processes, features, means, or instructions for transmitting user data to the at least one UE during a symbol period of the common control region based on the data multiplexing indication, where the user data is transmitted using a portion of the system bandwidth that is different from the bandwidth of the common control region. In some cases, the symbol period comprises a first symbol period, a second symbol period, a third symbol period, or a fourth symbol period of a subframe and the different portion of the system bandwidth comprises a bandwidth narrower than the bandwidth of the common control region.

In some examples of the method, apparatus, or non-transitory computer-readable medium described above, the control region information is transmitted in a broadcast message or a CCCH. The broadcast message may be part of a logical channel such as a MIB and/or SIB, carried on a PBCH. Some examples of the method, apparatus, or non-transitory computer-readable medium described above may further include processes, features, means, or instructions for transmitting a common control region update message to the at least one UE.

In some examples of the method, apparatus, or non-transitory computer-readable medium described above, the common control region update message is transmitted using a UE specific control channel or an RRC configuration message. In some examples of the method, apparatus, or non-transitory computer-readable medium described above, the control information is transmitted using an anchor subband of the common control region.

In some examples of the method, apparatus, or non-transitory computer-readable medium described above, the control region information comprises a location of the anchor subband. In some examples of the method, apparatus, or non-transitory computer-readable medium described above, the control region information comprises an indication of a number of control region subbands, a bandwidth and associated frequency-time numerology for each of the number of control region subbands, a frequency for each of the number of control region subbands, or any combination thereof.

Some examples of the method, apparatus, or non-transitory computer-readable medium described above may further include processes, features, means, or instructions for transmitting a subband assignment message indicating a subband of the common control region, where the control information is transmitted using the subband.

DETAILED DESCRIPTION

Figure 1:
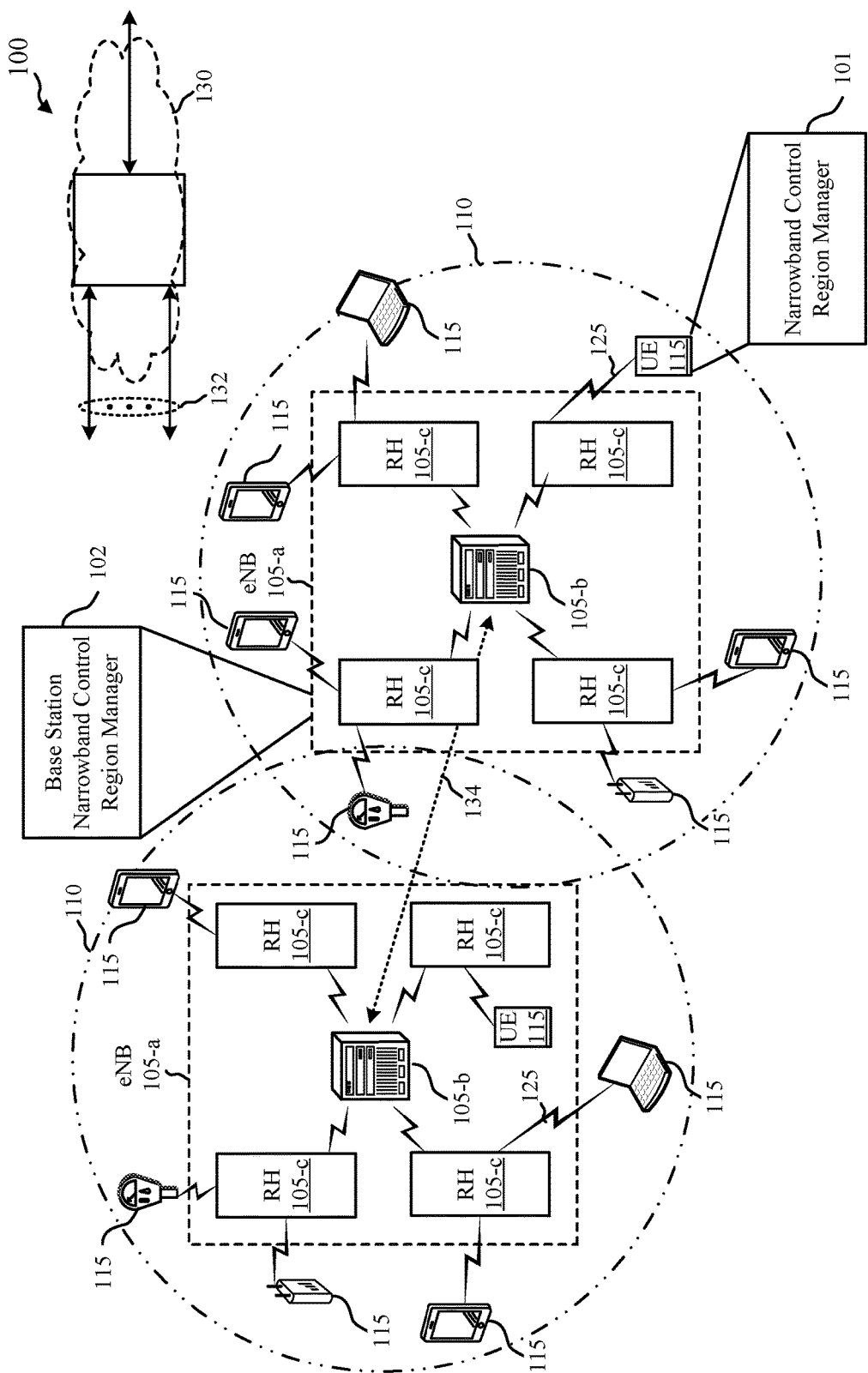
FIGS. 1 and 2 illustrate examples of wireless communications systems that supports narrowband CCCH subband design and signaling in accordance with one or more aspects of the present disclosure.

Multiplexing a CCCH region with downlink (DL) data may enable more efficient use of bandwidth that is not occupied by the control region. A base station may distribute transmit power between the control region and the data region at any given time. In circumstances with a tight link budget, most or all of the power may be used for the control region.

A base station may signal configuration information for a common control region that enables data multiplexing. The signaling information may include the control region's span in frequency domain (i.e., the bandwidth and center frequency) and an indication of whether control and data multiplexing is enabled. In some cases, the signaling information may also include an indication of the frequency-time numerology (e.g., subcarrier spacing and symbol period) associated with the common control region or a data region for one or multiple UEs.

Dividing the common control region into multiple subbands may enable different UEs to use a dedicated control channel subband. This may simplify control channel processing at the UE. Control channel capacity for a given UE may be expanded by assigning multiple subbands without significantly impacting processing complexity. In some cases, one of the subbands may be designated as an anchor subband. The anchor subband may be assigned based on a cell specific or network specific setting. For example, in some cases, the center subband may be designated as the anchor subband. A UE may use the anchor subband by default when it is not explicitly assigned to another subband (e.g., a UE in idle mode).

A base station may configure the subbands using explicit signaling. For example, a base station may transmit subband assignment information to each UE indicating an assigned subband. Information related to the overall subband configuration (e.g., the number of subbands enabled, the location of anchor subband, the status of data multiplexing, etc.) may also be transmitted by the base station. In some cases, the bandwidth and associated frequency-time numerology (e.g., subcarrier spacing and symbol period) of individual subbands may be transmitted by the base station and may vary between different subbands.

A base station may transmit control information using a narrowband common control region that occupies a portion of a system bandwidth. In some cases, data may be multiplexed during the same time period in tones that are not used by the common control region. The base station may transmit control region configuration information to one or more UEs such as the bandwidth and associated frequency-time numerology, central frequency, and multiplexing status of the common control region. In some cases, the common control region may be divided into subbands, and different UEs may be assigned to monitor different subbands. Unassigned UEs may monitor a default anchor subband.

Aspects of the disclosure are initially described in the context of a wireless communication system. Examples of physical layer structure for the common control region design are then described. Aspects of the disclosure are further illustrated by and described with reference to apparatus diagrams, system diagrams, and flowcharts that relate to narrowband CCCH subband design and signaling.

FIG. 1 illustrates an example of a wireless communication system 100, in accordance with various aspects of the disclosure. The wireless communication system 100 may include network access devices 105, UEs 115, and a core network 130. The wireless communication system 100 may be an example of a system that supports a dynamic narrowband common control region with data multiplexing.

The core network 130 may provide user authentication, access authorization, tracking, Internet Protocol (IP) connectivity, and other access, routing, or mobility functions. At least some of the network access devices 105 (e.g., network access device 105-a, which may be an example of an eNB or a base station, or network access device 105-b, which may be an example of an access node controller (ANC)) may interface with the core network 130 through backhaul links 132 (e.g., S1, S2, etc.) and may perform radio configuration and scheduling for communication with the UEs 115. In various examples, the network access devices 105-b may communicate, either directly or indirectly (e.g., through core network 130), with each other over backhaul links 134 (e.g., X1, X2, etc.), which may be wired or wireless communication links.

Each network access device 105-b may also communicate with a number of UEs 115 through a number of other network access devices 105-c, where network access device 105-c may be an example of a smart radio head. In alternative configurations, various functions of each network access device 105 may be distributed across various network access devices 105 (e.g., radio heads and access network controllers) or consolidated into a single network access device 105 (e.g., a base station).

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers (CCs)).

The wireless communication system 100 may support synchronous or asynchronous operation. For synchronous operation, the network access devices 105-a and/or network access devices 105-c may have similar frame timing, and transmissions from different network access devices 105-a and/or network access devices 105-c may be approximately aligned in time. For asynchronous operation, the network access devices 105-a and/or network access devices 105-c may have different frame timings, and transmissions from different network access devices 105-a and/or network access devices 105-c may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid automatic repeat request (HARQ) to provide retransmission at the MAC layer to improve link efficiency. In the control plane, the RRC protocol layer may provide establishment, configuration, and maintenance of an RRC connection between a UE 115 and a network access device 105-c, network access device 105-b, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an internet of everything (IoE) device, or the like. A UE may be able to communicate with various types of network access devices 105-a, network access devices 105-c, base stations, access points, or other network access devices, including macro eNBs, small cell eNBs, relay base stations, and the like. A UE may also be able to communicate directly with other UEs (e.g., using a peer-to-peer (P2P) protocol).

The communication links 125 shown in wireless communication system 100 may include uplink (UL) channels from a UE 115 to a network access device 105-c, and/or DL channels, from a network access device 105-c to a UE 115. The downlink channels may also be called forward link channels, while the uplink channels may also be called reverse link channels. Control information and data may be multiplexed on an UL channel or UL channel according to various techniques. Control information and data may be multiplexed on a DL channel, for example, using time division multiplexing (TDM) techniques, frequency division multiplexing (FDM) techniques, or hybrid TDM-FDM techniques. In some examples, the control information transmitted during a transmission time interval (TTI) of a DL channel may be distributed between different control regions in a cascaded manner (e.g., between a common control region and one or more UE-specific control regions).

Data may be divided into logical channels, transport channels, and PHY layer channels. Channels may also be classified into Control Channels and Traffic Channels. Logical control channels may include paging control channel (PCCH) for paging information, broadcast control channel (BCCH) for broadcast system control information, multicast control channel (MCCH) for transmitting multimedia broadcast multicast service (MBMS) scheduling and control information, dedicated control channel (DCCH) for transmitting dedicated control information, CCCH for random access information, dedicated traffic channel (DTCH) for dedicated UE data, and multicast traffic channel (MTCH), for multicast data. DL transport channels may include broadcast channel (BCH) for broadcast information, a DL shared channel (DL-SCH) for data transfer, paging channel (PCH) for paging information, and multicast channel (MCH) for multicast transmissions. UL transport channels may include random access channel (RACH) for access and UL shared channel (UL-SCH) for data.

DL PHY channels may include a PBCH for broadcast information, physical control format indicator channel (PCFICH) for control format information, physical downlink control channel (PDCCH) for control and scheduling information, physical HARQ indicator channel (PHICH) for HARQ status messages, physical downlink shared channel (PDSCH) for user data and physical multicast channel (PMCH) for multicast data. UL PHY channels may include physical random access channel (PRACH) for access messages, physical uplink control channel (PUCCH) for control data, and physical uplink shared channel (PUSCH) for user data.

After completing initial cell synchronization, a UE 115 may decode the MIB, or one or more SIBs such as SIB1 and SIB2 on PBCH prior to accessing the network. The MIB may be transmitted on PBCH and may utilize the first 4 OFDMA symbols of the second slot of the first subframe of each radio frame. It may use the middle 6 resource blocks (RBs) (72 subcarriers) in the frequency domain. The MIB carries a few important pieces of information for UE initial access, including: DL channel bandwidth in term of RBs, PHICH configuration (duration and resource assignment), and system frame number (SFN). A new MIB may be broadcast every fourth radio frame (SFN mod 4=0) at and rebroadcast every frame (10 ms).

After receiving the MIB, a UE may receive SIBs. Different SIBs may be defined according to the type of system information (SI) conveyed. A new SIB1 may be transmitted in the fifth subframe of every eighth frame (SFN mod 8=0) and rebroadcast every other frame (20 ms). SIB1 includes access information, including cell identity (CID) information, and it may indicate whether a UE is allowed to camp on a cell of a base station 105. SIB1 also includes cell selection information (or cell selection parameters). Additionally, SIB1 includes scheduling information for other SIBs. SIB2 may be scheduled dynamically according to information in SIB1, and includes access information and parameters related to common and shared channels. The periodicity of SIB2 can be set to 8, 16, 32, 64, 128, 256, or 512 radio frames.

PDCCH carries downlink control information (DCI) in at least one control channel elements (CCEs), which may consist of nine logically contiguous resource element groups (REGs), where each REG contains 4 resource elements (REs). DCI includes information regarding DL scheduling assignments, UL resource grants, transmission scheme, UL power control, HARQ information, modulation and coding scheme (MCS) and other information. The size and format of the DCI messages can differ depending on the type and amount of information that is carried by the DCI. For example, if spatial multiplexing is supported, the size of the DCI message is large compared to contiguous frequency allocations. Similarly, for a system that employs multiple input multiple output (MIMO), the DCI must include additional signaling information. DCI size and format depend on the amount of information as well as factors such as bandwidth, the number of antenna ports, and duplexing mode.

PDCCH can carry DCI messages associated with multiple users, and each UE 115 may decode the DCI messages that are intended for it. For example, each UE 115 may be assigned a cell radio network temporary identity (C-RNTI) and cyclic redundancy check (CRC) bits attached to each DCI may be scrambled based on the C-RNTI. To reduce power consumption and overhead at the UE, a limited set of CCE locations can be specified for DCI associated with a specific UE 115. CCEs may be grouped (e.g., in groups of 1, 2, 4 and 8 CCEs), and a set of CCE locations in which the UE may find relevant DCI may be specified. These CCEs may be known as a search space. The search space can be partitioned into two regions: a common CCE region or search space and a UE-specific (dedicated) CCE region or search space.

The common CCE region may be monitored by all UEs served by a base station 105 and may include information such as paging information, SI, random access procedures and the like. The UE-specific search space may include user-specific control information. CCEs may be indexed, and the common search space may start from CCE 0. The starting index for a UE specific search space depends on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt descramble all potential DCI messages using its C-RNTI, and perform a CRC check to determine whether the attempt was successful.

Wireless communication system 100 may support operation on multiple cells or carriers, a feature which may be referred to as carrier aggregation or multi-carrier operation. A carrier may also be referred to as a CC, a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplex (FDD) and time division duplex (TDD) CCs.

In some cases, a wireless communications system may utilize one or more enhanced CCs (ECCs). An ECC may be characterized by one or more features including: flexible bandwidth, variable length TTIs, and modified control channel configuration. In some cases, an ECC may be associated with a carrier aggregation configuration or a dual connectivity configuration (i.e., when multiple serving cells have a suboptimal backhaul link). An ECC may also be configured for use in unlicensed spectrum or shared spectrum (where more than one operator is licensed to use the spectrum). An ECC characterized by flexible bandwidth may include one or more segments that may be utilized by UEs 115 that do are not capable of monitoring the whole bandwidth or prefer to use a limited bandwidth (e.g., to conserve power).

In some cases, an ECC may utilize a variable TTI length, which may include use of a different frequency-time numerology, such as reduced or variable symbol duration. In some cases the symbol duration may remain the same, but each symbol may represent a distinct TTI. In some cases an ECC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing.

Flexible bandwidth and variable TTIs may be associated with a modified control channel configuration (e.g., an ECC may utilize an enhanced PDCCH (ePDCCH) for DCI). For example, one or more control channels of an ECC may utilize FDM scheduling to accommodate flexible bandwidth use. Other control channel modifications include the use of additional control channels (e.g., for enhanced MBMS (eM-BMS) scheduling, or to indicate the length of variable length UL and DL bursts), or control channels transmitted at different intervals. An ECC may also include modified or additional HARQ related control information.

A UE 115 may include a narrowband control region manager 101, which may receive control region information comprising an indication of a bandwidth and associated frequency-time numerology of a common control region, a central frequency of the common control region, or a data multiplexing indication, the bandwidth of the common control region comprising at least a portion of a system bandwidth, and monitor the common control region based on the control region information. The narrowband control region manager 101 may also be an example of aspects of the narrowband control region manager 805 described with reference to FIG. 8.

A base station 105 may include a base station narrowband control region manager 102, which may transmit control region information comprising an indication of a bandwidth and associated frequency-time numerology of a common control region, a central frequency of the common control region, or a data multiplexing indication, the bandwidth of the common control region comprising at least a portion of a system bandwidth, and transmit control information to at least one UE 115 using the common control region. The base station narrowband control region manager 102 may also be an example of aspects of the base station narrowband control region manager 1205 described with reference to FIG. 12.

Thus, a base station 105 may transmit control information using a narrowband common control region that occupies a portion of a system bandwidth. In some cases, data may be multiplexed during the same time period in tones that are not used by the common control region. The base station may transmit control region configuration information to one or more UEs 115 such as the bandwidth and associated frequency-time numerology, central frequency, and multiplexing status of the common control region. In some cases, the common control region may be divided into subbands, and different UEs 115 may be assigned to monitor different subbands. Unassigned UEs 115 may monitor a default anchor subband.

Figure 2:
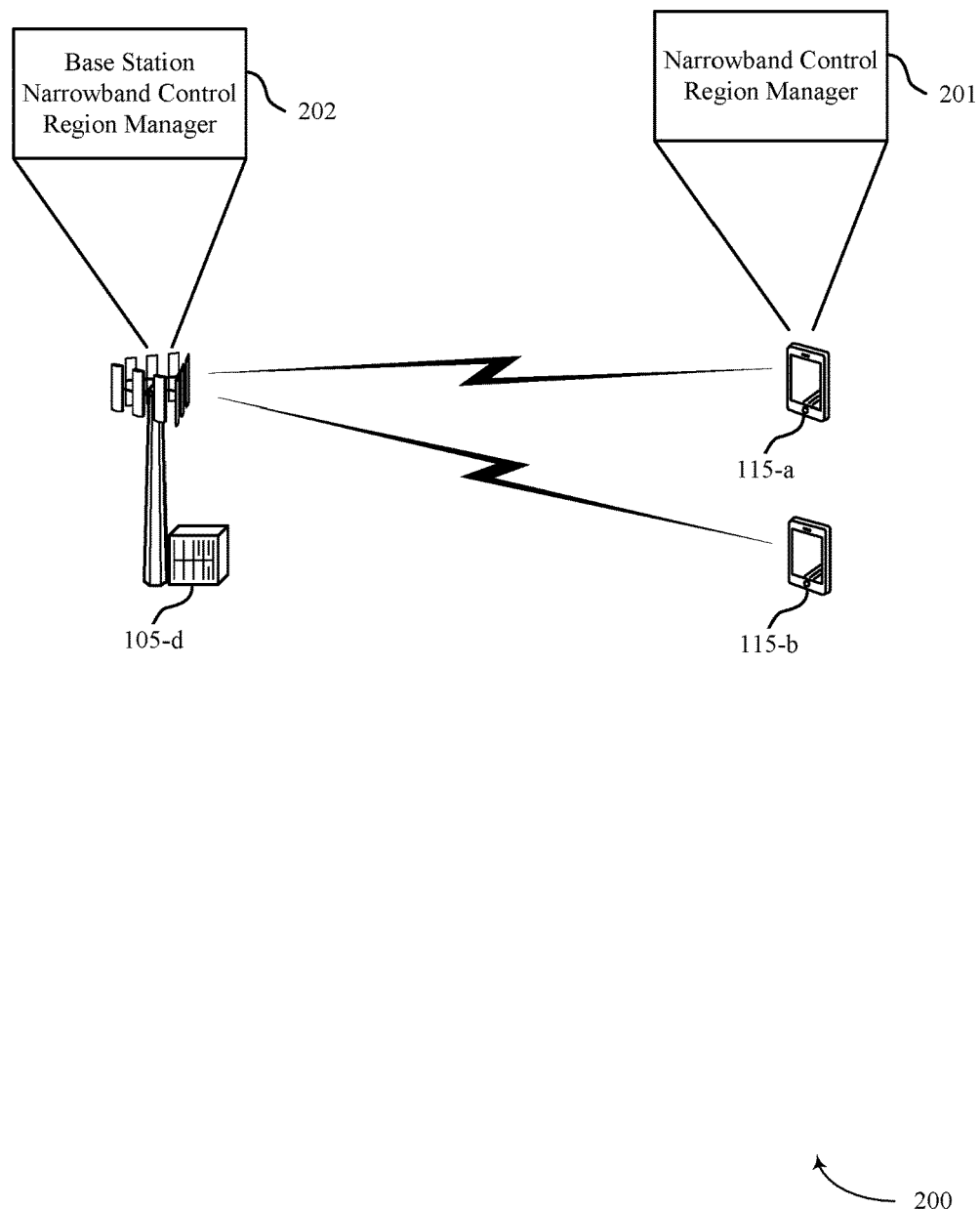

FIG. 2 illustrates an example of a wireless communication system 200 for narrowband CCCH subband design and signaling in accordance with one or more aspects of the present disclosure. Wireless communication system 200 may include base station 105-d, UE 115-a, and UE 115-b, which may be examples of the corresponding devices described with reference to FIG. 1. Wireless communication system 200 may be an example of a system that supports a dynamic narrowband common control region with data multiplexing.

Multiplexing a CCCH region with DL data may enable more efficient use of bandwidth not occupied by a narrowband control region. The bandwidth outside the control region may also carry a demodulation reference signal (DMRS) for demodulating DL data. In some cases, data multiplexed with control information may be processed after a delay. That is, symbols may be buffered and processed after the control information is decoded. Base station 105-d may distribute transmit power between the control region and the data region at any given time. In circumstances with a tight link budget, most or all of the power may be used for the control region.

Base station 105-d may signal configuration information for a common control region that enables data multiplexing. The signaling information may include the attributes of the control region in the frequency domain (i.e., the bandwidth and associated frequency-time numerology, and the center frequency) and an indication of whether control and data multiplexing is enabled. In some examples, information related to the attributes of the control region and the status of control and data multiplexing may be sent over broadcast channel (e.g., in a discovery signal, a MIB, or a SIB). In other examples, the information may be transmitted over the CCCH (e.g., in PCFICH or a similar channel).

Dividing a common control region into multiple subbands may enable different UEs to use a dedicated control channel subband. This may simplify control channel processing at the UE. Control channel capacity for UE 115-*a* may be expanded by assigning multiple subbands without significantly impacting processing complexity. In some cases, one of the subbands may be designated as an anchor subband. The anchor subband may be assigned based on a cell specific or network specific setting. For example, in some cases, the center subband may be designated as the anchor subband. UE 115-*a* or UE 115-*b* may use the anchor subband by default when it is not explicitly assigned to another subband (e.g., a UE 115 in idle mode).

Base station 105-*d* may configure the subbands using explicit signaling. For example, a base station may transmit subband assignment information to UE 115-*a* and UE 115-*b* indicating an assigned subband. In some examples, this signaling may be accomplished using a semi-static Layer 1 (L1) message such as RRC signaling. In other examples, dynamic signaling may be conveyed using a physical control channel (e.g., PDCCH), by embedding control in the data region, or through the use of L1 messaging. Information related to the overall subband configuration (e.g., the number of subbands enabled, the location of anchor subband, the status of data multiplexing, etc.) may also be transmitted by the base station 105-*d*.

UE 115-*a* (and UE 115-*b*, not shown) may include a narrowband control region manager 201, which may receive control region information comprising an indication of a bandwidth and associated frequency-time numerology of a common control region, a central frequency of the common control region, or a data multiplexing indication, the bandwidth of the common control region comprising at least a portion of a system bandwidth, and monitor the common control region based on the control region information. The narrowband control region manager 201 may also be an example of aspects of the narrowband control region manager 805 described with reference to FIG. 8.

Base station 105-*d* may include a base station narrowband control region manager 202, which may transmit control region information comprising an indication of a bandwidth and associated frequency-time numerology of a common control region, a central frequency of the common control region, or a data multiplexing indication, the bandwidth of the common control region comprising at least a portion of a system bandwidth, and transmit control information to UE 115-*a* and UE 115-*b* using the common control region. The base station narrowband control region manager 202 may also be an example of aspects of the base station narrowband control region manager 1205 described with reference to FIG. 12.

Figure 3:
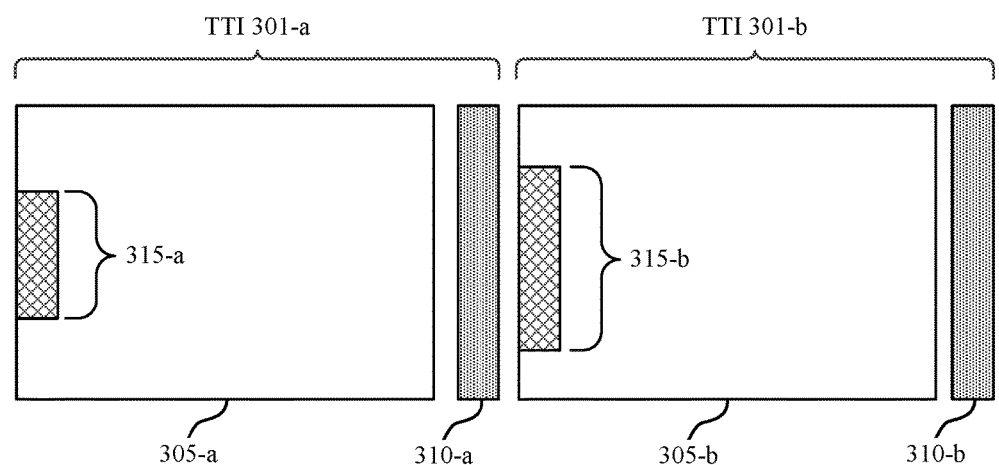
FIGS. 3 through 6 illustrate examples of physical layer structures that support narrowband CCCH subband design and signaling in accordance with one or more aspects of the present disclosure.

FIG. 3 illustrates an example of a PHY layer structure 300 for narrowband CCCH subband design and signaling. In some cases, PHY layer structure 300 may represent aspects of a wireless PHY layer used by a UE 115 or base station 105 as described with reference to FIGS. 1 and 2. PHY layer structure 300 may represent a semi-statically or dynamically changing narrowband common control region in a DL centric subframe structure.

A DL centric subframe structure may include shared data region 305 and common control region 315 (which may occupy only a portion of the total carrier bandwidth), and may end with UL region 310, which may be prescheduled, and may be independent of shared data region 305. In some cases, the common control region 315 may occupy the entire system bandwidth (not shown). In other cases, common control region 315 may occupy less than the system bandwidth 405, but the total transmit power of a base station 105 may be used for the common control region 315 such that no power is available to transmit on the unoccupied tones.

In some cases, more REs may be usable for shared data region 305-*a* by multiplexing the shared data region 305-*a* during the same symbol periods as common control region 315-*a* during first TTI 301-*a*. In one example, the shared data region 305-*a* and the common control region 315-*a* may be multiplexed in a first symbol of the TTI 301-*a*. In some cases, a base station 105 may transmit more control information in a second TTI 301-*b*, so the size of the common control region 315-*b* may be increased, as shown. The shared data region 305-*b* and the common control region 315-*b* may be multiplexed in one of the first symbols of the TTI 301-*a*, such as the first symbol, the second symbol, the third symbol, or the fourth symbol, etc.

Figure 4:
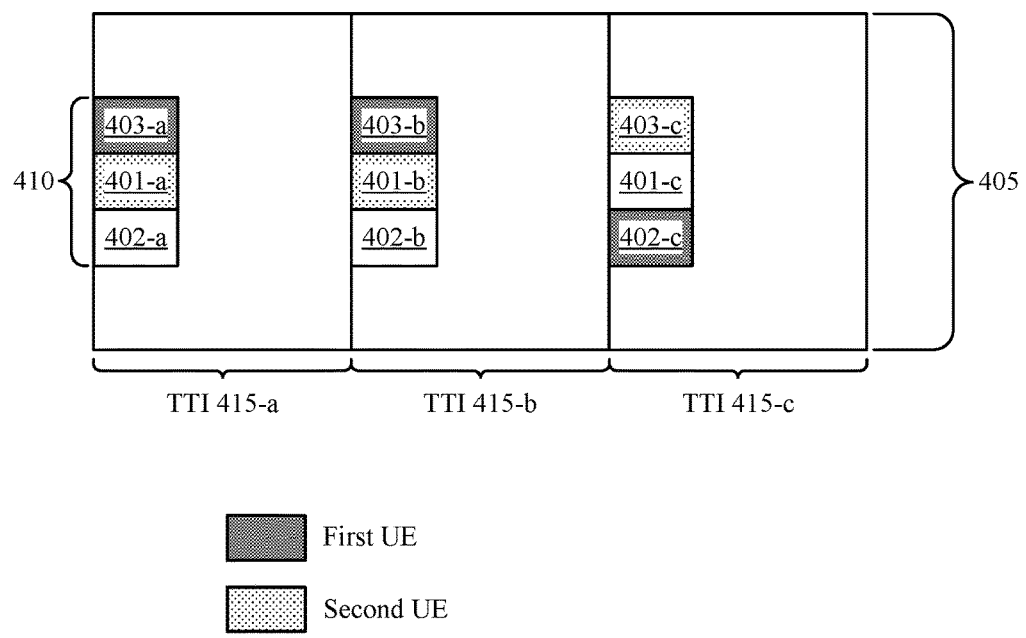

FIG. 4 illustrates an example of a PHY layer structure 400 for narrowband CCCH subband design and signaling. In some cases, PHY layer structure 400 may represent aspects of a wireless PHY layer used by a UE 115 or base station 105 as described with reference to FIGS. 1 and 2. PHY layer structure 400 may represent a semi-statically or dynamically changing narrowband common control region in a DL centric subframe structure in which different subbands within the common control region are assigned to specific UEs 115.

PHY layer structure 400 may illustrate a common control region 410, which may occupy a portion of system bandwidth 405. The common control region 410 may be subdivided into control channel subbands, subband 401, subband 402, and subband 403. Control channel subband 401, subband 402, and subband 403 may have the same bandwidth or different bandwidths, and may be semi-statically or dynamically configurable. In some examples, at least one of control channel subband 401, subband 402, subband 403, or a combination thereof, may be multiplexed in a first symbol period of the TTI 415 and may also be multiplexed with data in the first symbol period. In some cases, the data may be multiplexed using a different bandwidth (e.g., a narrower bandwidth) than the common control region 410.

During TTI 415-*a*, a first UE 115 may be assigned to monitor subband 403-*a*, and subband 401-*a* may be designated as anchor subband. A second UE 115, which is not associated with any other subband, may monitor anchor subband 401-*a*.

During TTI 415-*b*, the first UE 115 may be signaled a subband assignment change from subband 403-*b* (e.g., dynamically via PDCCH, embedded control in the data region, or semi-statically via an L1 message). The second UE 115 may also be signaled a subband assignment from subband 401-*b*. In some cases, only a subset of UEs 115 may receive a subband assignment during a given TTI 415.

Following a successful subband assignment change during TTI 415-*b*, the first UE 115 may monitor subband 402-*c* and the second UE 115-*a* may monitor subband 403-*c* in TTI 415-*c*.

Figure 5:
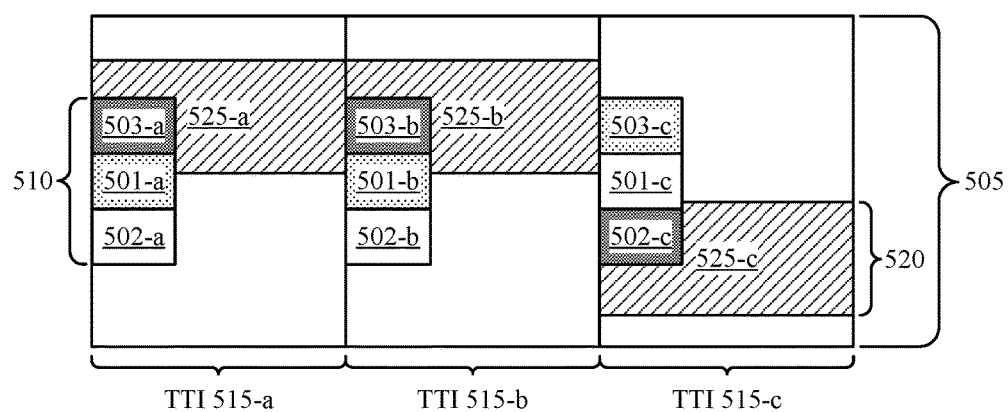

FIG. 5 illustrates an example of a PHY layer structure 500 for narrowband CCCH subband design and signaling. In some cases, PHY layer structure 500 may represent aspects of a wireless PHY layer used by a UE 115 or base station 105 as described with reference to FIGS. 1 and 2. PHY layer structure 500 may represent a semi-statically or dynamically changing narrowband common control region in a DL centric subframe structure in which different subbands within the common control region are assigned to specific UEs 115.

PHY layer structure 500 includes a common control region 510, which may occupy a portion of system bandwidth 505. The common control region 510 may be subdivided into control channel subbands, subband 501, subband 502, and subband 503. Control channel subband 501, subband 502, and subband 503 may have the same bandwidth or different bandwidths, and may be semi-statically or dynamically configurable. In some examples, control channel subband 501, subband 502, subband 503, or a combination thereof, may be multiplexed in a first symbol period of the TTI 515 and may also be multiplexed with data in the first symbol period. In some cases, the data may be multiplexed using a different bandwidth (e.g., a narrower bandwidth) than the common control region 510 or the system bandwidth 505. Thus, the subcarriers allocated to control channel subbands 501, 502, and 503 or bandwidth 520 may be less than the system bandwidth 505. Further, the control channel subbands 501, 502, and 503 may be associated with different frequency-time numerologies that may vary between TTIs 515. For example, control channel subband 501-a may be associated with a first numerology in TTI 515-a, while subband 502-a may be associated with a second different numerology in TTI 515-a. In TTI 515-b, control channel subband 501-b may be associated with the first numerology, while control channel subband 502-b may be associated with a third numerology different from the first numerology, the second numerology, or both.

In some examples, a UE 115 may narrow its receiver bandwidth to be a subset of the system bandwidth 505 prior to receiving information within control channel subbands 501, 502, or 503. Thus, instead of waiting to receive signaling indicating the bandwidth allocated to the UE 115, the UE 115 may narrow its receiver bandwidth in advance, which may help prevent unnecessary listening or monitoring of the system bandwidth 505. The narrowed bandwidth may overlap at least a portion of the control channel subband that UE 115 is assigned to monitor. For example, system bandwidth 505 may be 100 MHz, while the narrowed receiver bandwidth 520 associated with UE 115 may be 20 MHz. The actual resources allocated to the UE 115 may span a subset of bandwidth 520 and may be allocated to the UE 115 through an indication received (e.g., transmitted from a base station 105 to the UE 115) in common control region 510. For instance, during TTI 515-a, a first UE 115 may be assigned to monitor control channel subband 503-a, and control channel subband 501-a may be designated as anchor subband. A second UE 115, which is not associated with any other control channel subband, may monitor anchor subband 501-a. By monitoring TTI 515-a, the first UE 115 may determine or receive an indication that resources 525-a within TTI 515-a are assigned to the first UE 115 (e.g., to be used for data transmission or reception). In some cases, the first UE 115 may also receive an indication of the numerology associated with the assigned resources 525-a, 525-b, 525-c, or a combination thereof. In some examples, the assigned resources 525 may span the narrowed receiver bandwidth 520, as shown, or may span a portion of resource 525.

During TTI 515-b, the first UE 115 may monitor control channel subband 503-b and may determine or receive an indication that the first UE 115 is allocated resources 525-b for data communication. The first UE 115 may receive the indication from signaling in the control channel subband 503-b and may receive an indication that the bandwidth of the allocated resources 525-b are narrower than the system bandwidth 505. In some cases, as shown, the resources 525-b may overlap at least a portion of control region 510 including control channel subband 503-b.

Also during TTI 515-b, the first UE 115 may be signaled a subband assignment change from control channel subband 503-b (e.g., dynamically via PDCCH, embedded control in the data region, or semi-statically via an L1 message). The second UE 115 may also be signaled a subband assignment from control channel subband 501-b. In some cases, only a subset of UEs 115 may receive a subband assignment during a given TTI 515. Following a successful subband assignment change during TTI 515-b, the first UE 115 may monitor control channel subband 502-c and the second UE 115-a may monitor control channel subband 503-c in TTI 515-c. In some cases, if a UE is signaled a subband assignment change, the resources associated with the UE may also be changed. For example, as shown in TTI 515-c, the first UE 115 may be assigned to monitor control channel subband 502-c, which may indicate different allocated resource 525-c for the first UE with respect to the previously allocated resources 525-b in TTI 515-b. To support the new resource and control subband assignment, the first UE 115 may re-tune its radio frequency circuitry (e.g., tune a local oscillator of the first UE 115) during a guard period between TTI 515-b and TTI 515-c. Dynamic or semi-static signaling of the control subband assignment change as described in FIG. 4, may also be used for signaling a resource allocation change for a given UE 115. In some instances, the data multiplexing indication may carry additional information about the allocated resources 525 (e.g., by defining the data subcarrier range) in relation to control channel subcarriers or may include information relating to the frequency-time numerology associated with the allocated resources 525 for a given UE 115.

Figure 6:
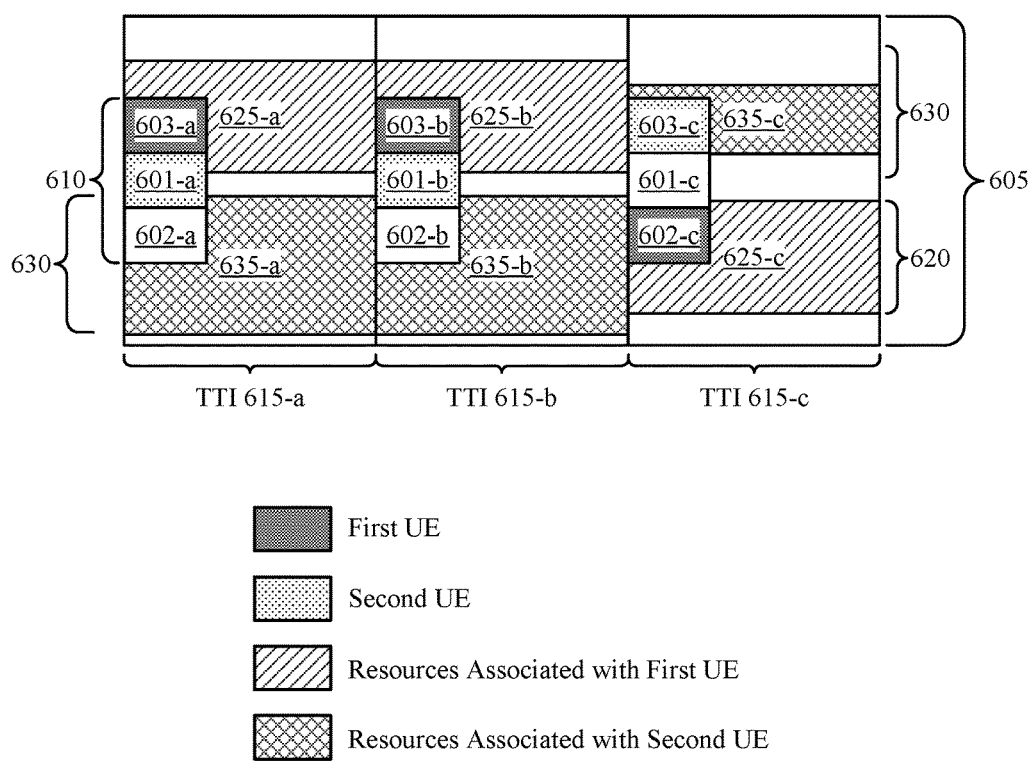

FIG. 6 illustrates an example of a PHY layer structure 600 for narrowband CCCH subband design and signaling. In some cases, PHY layer structure 600 may represent aspects of a wireless PHY layer used by a UE 115 or base station 105 as described with reference to FIGS. 1 and 2. PHY layer structure 600 may represent a semi-statically or dynamically changing narrowband common control region in a DL centric subframe structure in which different subbands within the common control region are assigned to specific UEs 115.

PHY layer structure 600 includes a common control region 610, which may occupy a portion of system bandwidth 605. The common control region 610 may be subdivided into control channel subbands, subband 601, subband 602, and subband 603. Control channel subband 601, subband 602, and subband 603 may have the same bandwidth or different bandwidths, and may be semi-statically or dynamically configurable. In some examples, control channel subband 601, subband 602, subband 603, or a combination thereof, may be multiplexed in a first symbol period of the TTI 615 and may also be multiplexed with data in the first symbol period. In some cases, the data may be multiplexed using a different bandwidth (e.g., a narrower bandwidth) than the common control region 610 or the system bandwidth 605. Thus, the subcarriers allocated to control channel subbands 601, 602, and 603 or bandwidth 620 may be less than the system bandwidth 605. Further, the control channel subbands 601, 602, and 603 may be associated with different frequency-time numerologies that, in some cases, may vary between TTIs 615. For example, control channel subband 601-a may be associated with a first numerology in TTI 615-a, while subband 602-a may be associated with a second different numerology in TTI 615-a. In TTI 615-b, control channel subband 601-b may be associated with the first numerology, while control channel subband 602-b may be associated with a third numerology different from the first numerology, the second numerology, or both.

In some cases, a first UE 115 may narrow its receiver bandwidth to be a subset of the system bandwidth 505 prior to receiving information within control channel subbands 601, 602, or 603. Thus, instead of waiting to receive signaling indicating the bandwidth allocated to the UE 115, the UE 115 may narrow its receiver bandwidth in advance, which may help prevent unnecessary listening or monitoring of the system bandwidth 605. The narrowed bandwidth may overlap at least a portion of the control channel subband that UE 115 is assigned to monitor. For example, system bandwidth 605 may be 100 MHz, while the narrowed receiver bandwidth 620 associated with a first UE 115 may be 20 MHz. In some cases, the resources allocated to a given UE may vary between TTIs 615 or may span a portion of the narrowed receiver bandwidth. For example, a second UE 115 may be allocated resources 635 that may be associated with a bandwidth 630 in TTIs 615-a and 615-b, but in TTI 615-c the allocated resource 635-c may only span a portion of bandwidth 630. It should be understood that the resources 635-c may span more subcarriers in TTI 615-c compared to resources 635-a and 635-b and may therefore have a bandwidth wider than bandwidth 630. Though not shown, resources 635-a, 635-b, and 635-c may span different bandwidths in each TTI 615 and the narrowed receiver bandwidth for a given UE may vary between TTIs 615.

The resources 625 or 635 may be allocated to a UE 115 through an indication received (e.g., transmitted from a base station 105 to the UE 115) in common control region 610. For instance, during TTI 615-a, a first UE 115 may be assigned to monitor control channel subband 603-a, and control channel subband 601-a may be designated as anchor subband. A second UE 115, which is not associated with any other control channel subband, may monitor anchor subband 601-a. By monitoring TTI 615-a, the first UE 115 may determine or receive an indication that resources 625-a within TTI 615-a are assigned to the first UE 115 (e.g., to be used for data transmission or reception). In some cases, the first UE 115 may also receive an indication of the numerology associated with the assigned resources 625-a, 625-b, 625-c, or a combination thereof. By monitoring TTI 615-a, the second UE 115 may determine or receive an indication that resources 635-a within TTI 615-a are assigned to the second UE 115 (e.g., to be used for data transmission or reception). In some cases, the second UE 115 may also receive an indication of the numerology associated with the assigned resources 635-a, 635-b, 635-c, or a combination thereof.

During TTI 615-b, the first UE 115 may monitor control channel subband 603-b and may determine or receive an indication that the first UE 115 is allocated resources 625-b for data communication. The second UE may monitor control channel subband 602-b and may determine or receive an indication that the second UE 115 is allocated resources 635-b for data communication.

In some cases, the first UE 115 or the second UE 115 may receive an indication that the bandwidth of the allocated resources 625-b or 635-b are narrower than the system bandwidth 605 or respective narrowed receiver bandwidths 620 and 630. In some cases, as shown, the resources 625-b or 635-b may overlap at least a portion of control region 610 including control channel subband 603-b or 602-b. Also during TTI 615-b, the first UE 115 may be signaled a subband assignment change from control channel subband 603-b (e.g., dynamically via PDCCH, embedded control in the data region, or semi-statically via an L1 message). The second UE 115 may be signaled a subband assignment from control channel subband 601-b. In some cases, only a subset of UEs 115 may receive a subband assignment during a given TTI 615.

Following a successful subband assignment change during TTI 615-b, the first UE 115 may monitor control channel subband 602-c and the second UE 115-a may monitor control channel subband 603-c in TTI 615-c. In some cases, if a UE 115 is signaled a subband assignment change, the resources associated with the UE 115 may also be changed. For example, as shown in TTI 615-c, the first UE 115 may be assigned to monitor control channel subband 602-c, which may indicate different allocated resources 625-c for the first UE with respect to the previously allocated resources 625-b in TTI 615-b. Further, the second UE 115 may be assigned to monitor control channel subband 603-c, which may indicate different allocated resource 635-c for the second UE with respect to the previously allocated resources 635-b in TTI 615-b.

To support the new resource and control subband assignment, the first and second UEs 115 may re-tune their radio frequency circuitry (e.g., by tuning a local oscillator) during a guard period between TTI 615-b and TTI 615-c. Dynamic or semi-static signaling of the control subband assignment change as described in FIG. 4, may also be used for signaling a resource allocation change for a given UE 115. In some instances, the data multiplexing indication may carry additional information about the allocated resources 625 or 635 (e.g., by defining the data subcarrier range) in relation to the control channel subcarriers or may include information relating to the frequency-time numerology associated with the allocated resources 625 or 635 for a given UE 115.

Figure 7:
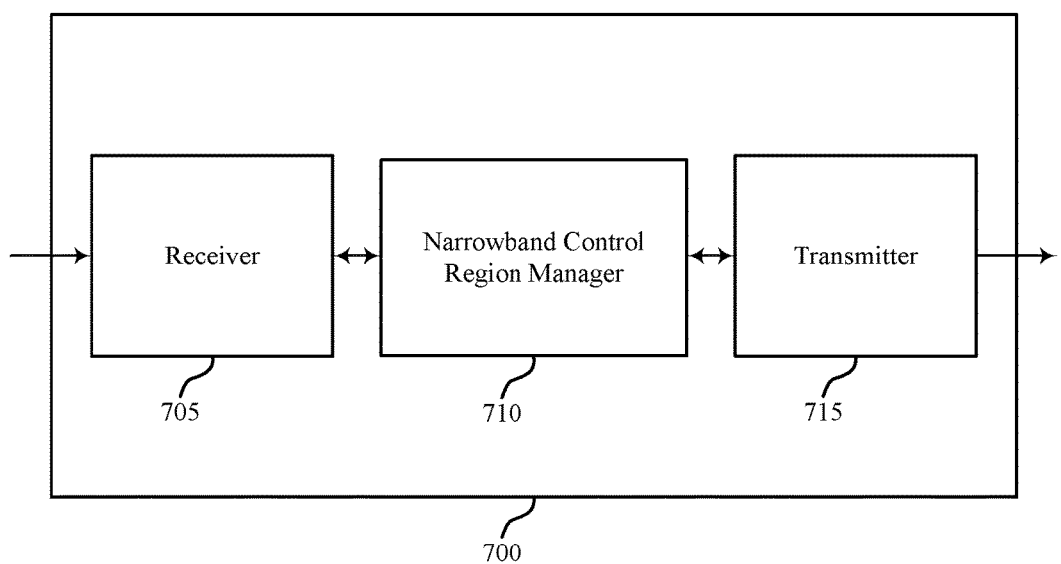
FIGS. 7 through 9 show block diagrams of a wireless device that supports narrowband CCCH subband design and signaling in accordance with one or more aspects of the present disclosure.

FIG. 7 shows a block diagram of a wireless device 700 that supports narrowband CCCH subband design and signaling in accordance with various aspects of the present disclosure. Wireless device 700 may be an example of aspects of a UE 115 described with reference to FIGS. 1 and 2. Wireless device 700 may include receiver 705, narrowband control region manager 710 and transmitter 715. Wireless device 700 may also include a processor. Each of these components may be in communication with each other.

The receiver 705 may receive information such as packets, user data, or control information associated with various information channels (e.g., control channels, data channels, and information related to narrowband CCCH subband design and signaling, etc.). Information may be passed on to other components of the device. The receiver 705 may be an example of aspects of the transceiver 1025 described with reference to FIG. 10.

The narrowband control region manager 710 may receive control region information comprising an indication of a bandwidth and associated frequency-time numerology of a common control region, a central frequency of the common control region, or a data multiplexing indication, the bandwidth of the common control region comprising at least a portion of a system bandwidth, and monitor the common control region based on the control region information. The narrowband control region manager 710 may also be an example of aspects of the narrowband control region manager 1005 described with reference to FIG. 10.

The transmitter 715 may transmit signals received from other components of wireless device 700. In some examples, the transmitter 715 may be collocated with a receiver in a transceiver module. For example, the transmitter 715 may be an example of aspects of the transceiver 1025 described with reference to FIG. 10. The transmitter 715 may include a single antenna, or may include a plurality of antennas.

Figure 8:
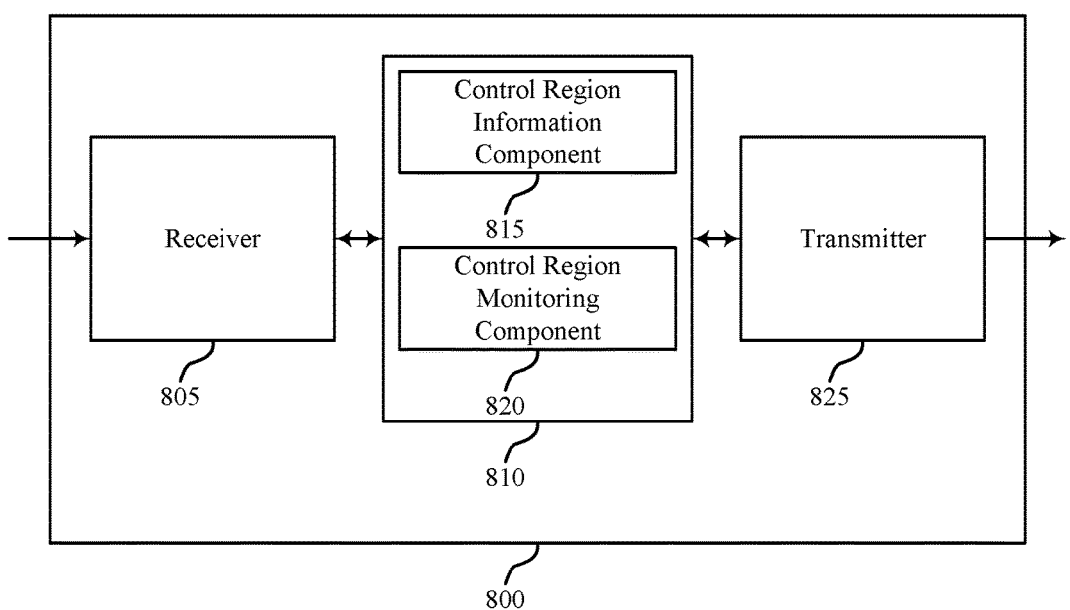

FIG. 8 shows a block diagram of a wireless device 800 that supports narrowband CCCH subband design and signaling in accordance with various aspects of the present disclosure. Wireless device 800 may be an example of aspects of a wireless device 700 or a UE 115 described with reference to FIGS. 1, 2, and 7. Wireless device 800 may include receiver 805, narrowband control region manager 810 and transmitter 825. Wireless device 800 may also include a processor. Each of these components may be in communication with each other.

The receiver 805 may receive information which may be passed on to other components of the wireless device 800. The receiver 805 may also perform the functions described with reference to the receiver 705 of FIG. 7. The receiver 805 may be an example of aspects of the transceiver 1025 described with reference to FIG. 10.

The narrowband control region manager 810 may be an example of aspects of narrowband control region manager 710 described with reference to FIG. 7. The narrowband control region manager 810 may include control region information component 815 and control region monitoring component 820. The narrowband control region manager 810 may be an example of aspects of the narrowband control region manager 1005 described with reference to FIG. 10.

The control region information component 815 may receive control region information comprising an indication of a bandwidth and associated frequency-time numerology of a common control region, a central frequency of the common control region, or a data multiplexing indication, the bandwidth of the common control region comprising at least a portion of a system bandwidth. In some cases, the control region information is received in a broadcast message or a CCCH. The control region monitoring component 820 may monitor the common control region based on the control region information.

The transmitter 825 may transmit signals received from other components of wireless device 800. In some examples, the transmitter 825 may be collocated with a receiver in a transceiver module. For example, the transmitter 825 may be an example of aspects of the transceiver 1025 described with reference to FIG. 10. The transmitter 825 may utilize a single antenna, or may utilize a plurality of antennas.

Figure 9:
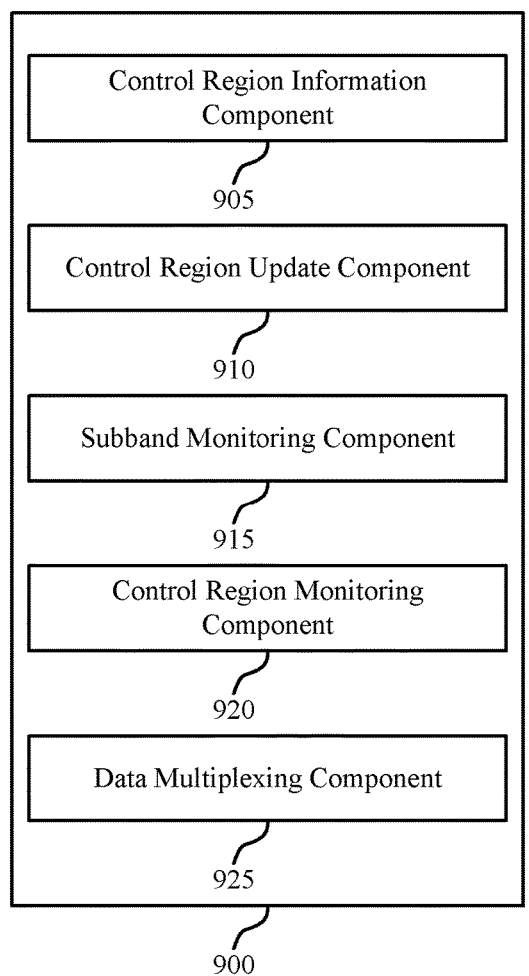

FIG. 9 shows a block diagram of a narrowband control region manager 900 which may be an example of the corresponding component of wireless device 700 or wireless device 800. That is, narrowband control region manager 900 may be an example of aspects of narrowband control region manager 710 or narrowband control region manager 910 described with reference to FIGS. 7 and 8. The narrowband control region manager 900 may also be an example of aspects of the narrowband control region manager 1005 described with reference to FIG. 10.

The narrowband control region manager 900 may include control region information component 905, control region update component 910, subband monitoring component 915, control region monitoring component 920, and data multiplexing component 925. Each of these modules may communicate, directly or indirectly, with one another (e.g., via one or more buses).

The control region information component 905 may receive control region information comprising an indication of a bandwidth and associated frequency-time numerology of a common control region, a central frequency of the common control region, or a data multiplexing indication, the bandwidth of the common control region comprising at least a portion of a system bandwidth.

The control region update component 910 may receive a common control region update message. In some cases, the common control region update message is received using a UE specific control channel or a RRC configuration message.

The subband monitoring component 915 may receive an assignment message indicating a subband of the common control region, and monitor the subband based on the assignment message. In some cases, monitoring the common control region comprises: monitoring an anchor subband of the common control region. In some cases, the control region information comprises a location of the anchor subband. In some cases, the control region information comprises an indication of a number of control region subbands, a bandwidth for each of the number of control region subbands, a frequency for each of the number of control region subbands, or any combination thereof.

The control region monitoring component 920 may monitor the common control region based on the control region information. The data multiplexing component 925 may receive user data during a symbol period of the common control region based on the data multiplexing indication, where the user data is received using a different portion of the system bandwidth from the bandwidth of the common control region. In some examples, the data multiplexing component 925 may receive user data during the first symbol period of a subframe and the different portion of the system bandwidth may be narrower than the bandwidth of the common control region.

Figure 10:
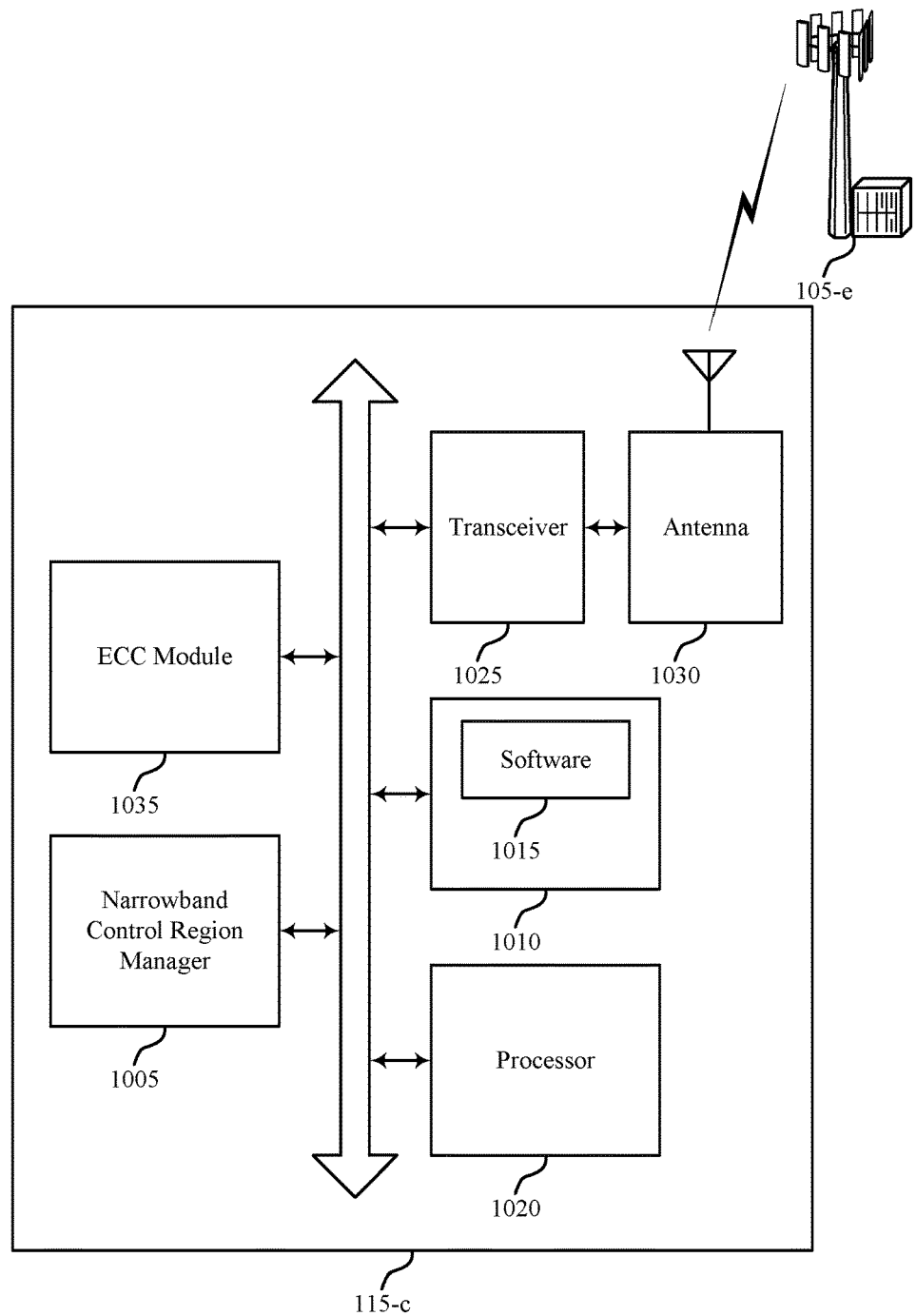
FIG. 10 illustrates a block diagram of a system including a UE that supports narrowband CCCH subband design and signaling in accordance with one or more aspects of the present disclosure.

FIG. 10 shows a diagram of a system 1000 including a device that supports narrowband CCCH subband design and signaling in accordance with various aspects of the present disclosure. For example, system 1000 may include UE 115-*c*, which may be an example of a wireless device 700, a wireless device 800, or a UE 115 as described with reference to FIGS. 1, 2, and 7 through 9.

UE 115-*c* may also include narrowband control region manager 1005, memory 1010, processor 1020, transceiver 1025, antenna 1030 and ECC module 1035. Each of these modules may communicate, directly or indirectly, with one another (e.g., via one or more buses). The narrowband control region manager 1005 may be an example of a narrowband control region manager as described with reference to FIGS. 7 through 9.

The memory 1010 may include random access memory (RAM) and read only memory (ROM). The memory 1010 may store computer-readable, computer-executable software including instructions that, when executed, cause the processor to perform various functions described herein (e.g., narrowband CCCH subband design and signaling, etc.). In some cases, the software 1015 may not be directly executable by the processor but may cause a computer (e.g., when compiled and executed) to perform functions described herein. The processor 1020 may include an intelligent hardware device, (e.g., a central processing unit (CPU), a microcontroller, an application specific integrated circuit (ASIC), etc.)

The transceiver 1025 may communicate bi-directionally, via one or more antennas, wired, or wireless links, with one or more networks, as described above. For example, the transceiver 1025 may communicate bi-directionally with a base station 105-*e* or a UE 115. The transceiver 1025 may also include a modem to modulate the packets and provide the modulated packets to the antennas for transmission, and to demodulate packets received from the antennas. In some cases, the wireless device may include a single antenna 1030. However, in some cases the device may have more than one antenna 1030, which may be capable of concurrently transmitting or receiving multiple wireless transmissions.

The ECC module 1035 may enable operations using enhanced component carriers (ECCs) such as communication using shared or unlicensed spectrum, using reduced transmission time intervals (TTIs) or subframe durations, or using a large number of component carriers (CCs).

Figure 11:
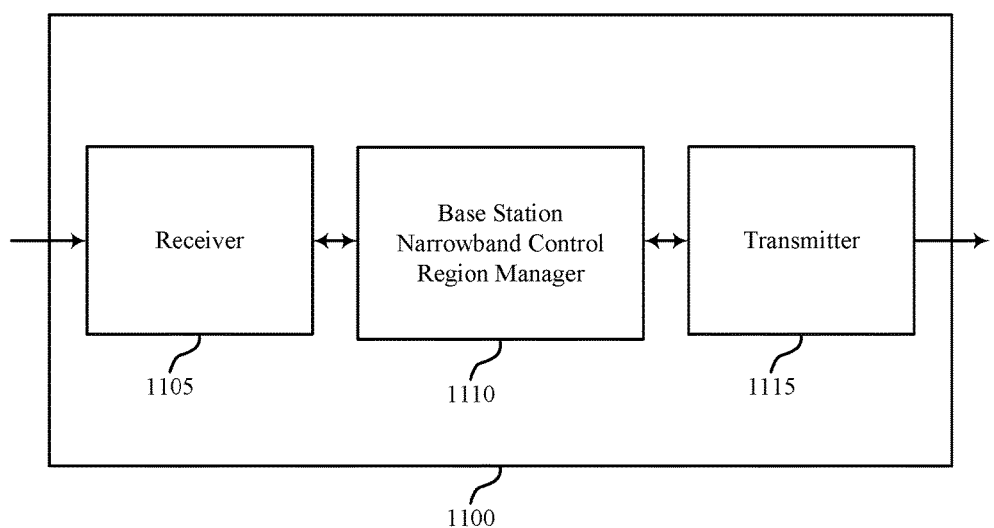
FIGS. 11 through 13 show block diagrams of a wireless device that supports narrowband CCCH subband design and signaling in accordance with one or more aspects of the present disclosure.

FIG. 11 shows a block diagram of a wireless device 1100 that supports narrowband CCCH subband design and signaling in accordance with various aspects of the present disclosure. Wireless device 1100 may be an example of aspects of a base station 105 described with reference to FIGS. 1 and 2. Wireless device 1100 may include receiver 1105, base station narrowband control region manager 1110 and transmitter 1115. Wireless device 1100 may also include a processor. Each of these components may be in communication with each other.

The receiver 1105 may receive information such as packets, user data, or control information associated with various information channels (e.g., control channels, data channels, and information related to narrowband CCCH subband design and signaling, etc.). Information may be passed on to other components of the wireless device 1100. The receiver 1105 may be an example of aspects of the transceiver 1425 described with reference to FIG. 14.

The base station narrowband control region manager 1110 may transmit control region information comprising an indication of a bandwidth and associated frequency-time numerology of a common control region, a central frequency of the common control region, or a data multiplexing indication, the bandwidth of the common control region comprising at least a portion of a system bandwidth, and transmit control information to at least one UE using the common control region. The base station narrowband control region manager 1110 may also be an example of aspects of the base station narrowband control region manager 1405 described with reference to FIG. 14.

The transmitter 1115 may transmit signals received from other components of wireless device 1100. In some examples, the transmitter 1115 may be collocated with a receiver in a transceiver module. For example, the transmitter 1115 may be an example of aspects of the transceiver 1425 described with reference to FIG. 14. The transmitter 1115 may include a single antenna, or may include a plurality of antennas.

Figure 12:
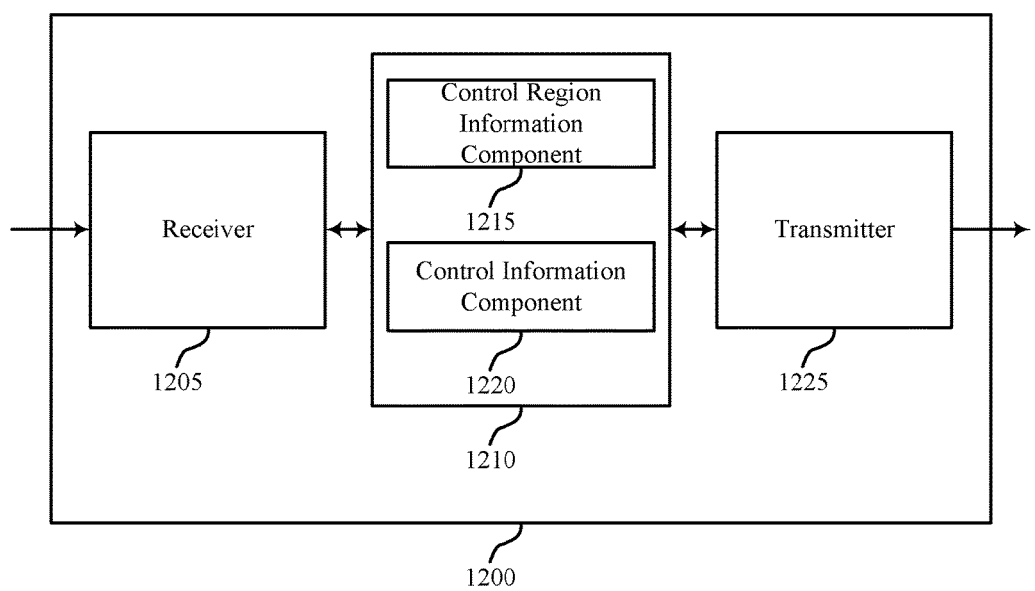

FIG. 12 shows a block diagram of a wireless device 1200 that supports narrowband CCCH subband design and signaling in accordance with various aspects of the present disclosure. Wireless device 1200 may be an example of aspects of a wireless device 1100 or a base station 105 described with reference to FIGS. 1, 2, and 11. Wireless device 1200 may include receiver 1205, base station narrowband control region manager 1210 and transmitter 1225. Wireless device 1200 may also include a processor. Each of these components may be in communication with each other.

The receiver 1205 may receive information which may be passed on to other components of the device. The receiver 1205 may also perform the functions described with reference to the receiver 1105 of FIG. 11. The receiver 1205 may be an example of aspects of the transceiver 1425 described with reference to FIG. 14.

The base station narrowband control region manager 1210 may be an example of aspects of base station narrowband control region manager 1110 described with reference to FIG. 11. The base station narrowband control region manager 1210 may include control region information component 1215 and control information component 1220. The base station narrowband control region manager 1210 may be an example of aspects of the base station narrowband control region manager 1405 described with reference to FIG. 14.

The control region information component 1215 may transmit control region information comprising an indication of a bandwidth and associated frequency-time numerology of a common control region, a central frequency of the common control region, or a data multiplexing indication, the bandwidth of the common control region comprising at least a portion of a system bandwidth, and transmit a subband assignment message indicating a subband of the common control region, where the control information is transmitted using the subband.

In some cases, the control region information is received in a broadcast message or a CCCH. In some cases, the control information is transmitted using an anchor subband of the common control region. In some cases, the control region information comprises a location of the anchor subband. In some cases, the control region information comprises an indication of a number of control region subbands, a bandwidth for each of the number of control region subbands, a frequency for each of the number of control region subbands, or any combination thereof.

The control information component 1220 may transmit control information to at least one UE using the common control region.

The transmitter 1225 may transmit signals received from other components of wireless device 1200. In some examples, the transmitter 1225 may be collocated with a receiver in a transceiver module. For example, the transmitter 1225 may be an example of aspects of the transceiver 1425 described with reference to FIG. 14. The transmitter 1225 may utilize a single antenna, or may utilize a plurality of antennas.

Figure 13:
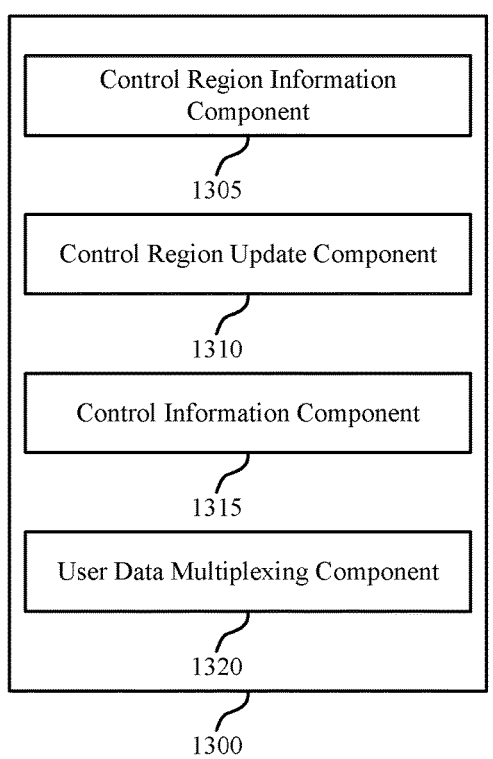

FIG. 13 shows a block diagram of a base station narrowband control region manager 1300 which may be an example of the corresponding component of wireless device 1100 or wireless device 1200. That is, base station narrowband control region manager 1300 may be an example of aspects of base station narrowband control region manager 1110 or base station narrowband control region manager 1210 described with reference to FIGS. 11 and 12. The base station narrowband control region manager 1300 may also be an example of aspects of the base station narrowband control region manager 1405 described with reference to FIG. 14.

The base station narrowband control region manager 1300 may include control region information component 1305, control region update component 1310, control information component 1315 and user data multiplexing component 1320. Each of these modules may communicate, directly or indirectly, with one another (e.g., via one or more buses).

The control region information component 1305 may transmit control region information comprising an indication of a bandwidth and associated frequency-time numerology of a common control region, a central frequency of the common control region, or a data multiplexing indication, the bandwidth of the common control region comprising at least a portion of a system bandwidth, and transmit a subband assignment message indicating a subband of the common control region, where the control information is transmitted using the subband.

The control region update component 1310 may transmit a common control region update message to the at least one UE. In some cases, the common control region update message is transmitted using a UE specific control channel or a RRC configuration message. The control information component 1315 may transmit control information to at least one UE using the common control region.

The user data multiplexing component 1320 may transmit user data to the at least one UE during a symbol period of the common control region based on the data multiplexing indication, where the user data is transmitted using a different portion of the system bandwidth from the bandwidth of the common control region.

Figure 14:
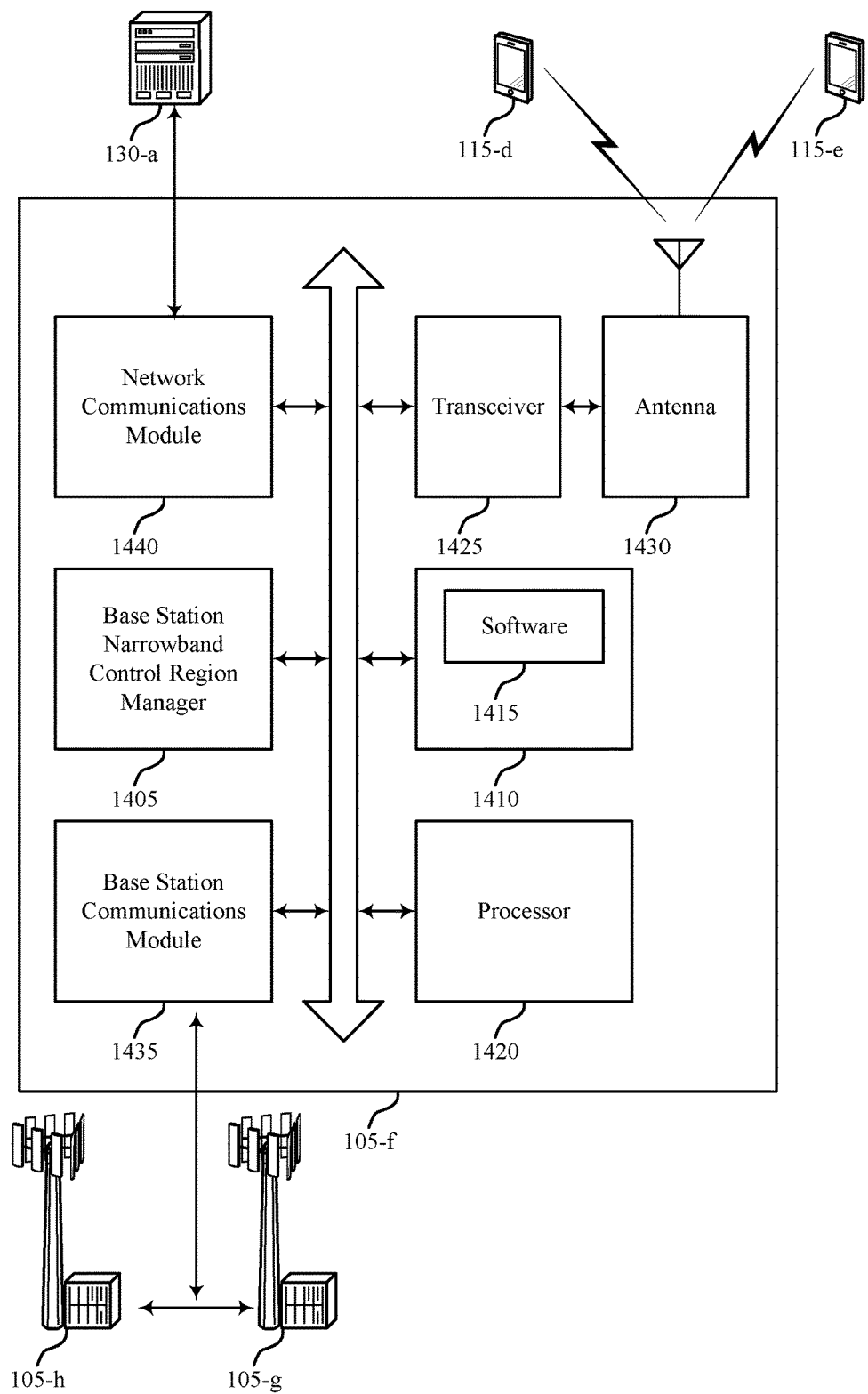
FIG. 14 illustrates a block diagram of a system including a base station that supports narrowband CCCH subband design and signaling in accordance with one or more aspects of the present disclosure.

FIG. 14 shows a diagram of a wireless system 1400 including a device configured that supports narrowband CCCH subband design and signaling in accordance with various aspects of the present disclosure. For example, system 1400 may include base station 105-*f*, which may be an example of a wireless device 1100, a wireless device 1200, or a base station 105 as described with reference to FIGS. 1, 2, and 11 through 13. Base station 105-*f* may also include components for bi-directional voice and data communications including components for transmitting communications and components for receiving communications. For example, base station 105-*f* may communicate bi-directionally with one or more UEs 115-*d* and 115-*e*.

Base station 105-*f* may also include base station narrowband control region manager 1405, memory 1410, processor 1420, transceiver 1425, antenna 1430, base station communications module 1435 and network communications module 1440. Each of these modules may communicate, directly or indirectly, with one another (e.g., via one or more buses). The base station narrowband control region manager 1405 may be an example of a base station narrowband control region manager as described with reference to FIGS. 11 through 13.

The memory 1410 may include RAM and ROM. The memory 1410 may store computer-readable, computer-executable software including instructions that, when executed, cause the processor to perform various functions described herein (e.g., narrowband CCCH subband design and signaling, etc.). In some cases, the software 1415 may not be directly executable by the processor but may cause a computer (e.g., when compiled and executed) to perform functions described herein. The processor 1420 may include an intelligent hardware device, (e.g., a CPU, a microcontroller, an ASIC, etc.)

The transceiver 1425 may communicate bi-directionally, via one or more antennas, wired, or wireless links, with one or more networks, as described above. For example, the transceiver 1425 may communicate bi-directionally with a base station 105 or a UE 115. The transceiver 1425 may also include a modem to modulate the packets and provide the modulated packets to the antennas for transmission, and to demodulate packets received from the antennas. In some cases, the wireless device may include a single antenna 1430. However, in some cases the device may have more than one antenna 1430, which may be capable of concurrently transmitting or receiving multiple wireless transmissions.

The base station communications module 1435 may manage communications with other base station 105-*g* and 105-*h*, and may include a controller or scheduler for controlling communications with UEs 115 in cooperation with other base stations 105-*g* and 105-*h*. For example, the base station communications module 1435 may coordinate scheduling for transmissions to UEs 115 for various interference mitigation techniques such as beamforming or joint transmission. In some examples, base station communications module 1435 may provide an X2 interface within an LTE/LTE-A wireless communication network technology to provide communication between base stations 105.

The network communications module 1440 may manage communications with the core network (e.g., via one or more wired backhaul links). For example, the network communications module 1440 may manage the transfer of data communications for client devices, such as one or more UEs 115.

Figure 15:
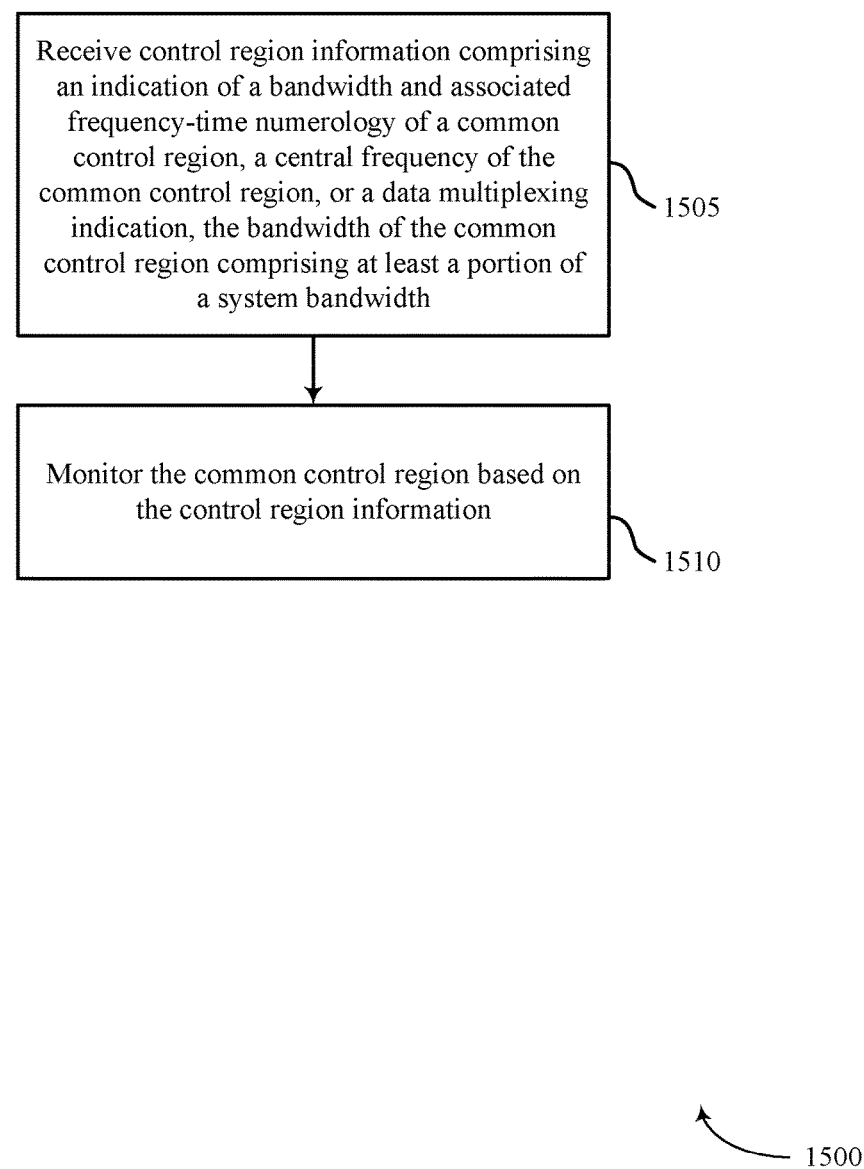
FIGS. 15 through 19 illustrate methods for narrowband CCCH subband design and signaling in accordance with one or more aspects of the present disclosure.

FIG. 15 shows a flowchart illustrating a method 1500 for narrowband CCCH subband design and signaling in accordance with various aspects of the present disclosure. The operations of method 1500 may be implemented by a device such as a UE 115 or its components as described with reference to FIGS. 1 and 2. For example, the operations of method 1500 may be performed by the narrowband control region manager as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may receive control region information comprising an indication of a bandwidth and associated frequency-time numerology of a common control region, a central frequency of the common control region, or a data multiplexing indication, the bandwidth of the common control region comprising at least a portion of a system bandwidth as described above with reference to FIGS. 2 through 6. In certain examples, the operations of block 1505 may be performed by the control region information component as described with reference to FIGS. 8 and 9.

At block 1510, the UE 115 may monitor the common control region based on the control region information as described above with reference to FIGS. 2 through 6. In certain examples, the operations of block 1510 may be performed by the control region monitoring component as described with reference to FIGS. 8 and 9.

Figure 16:
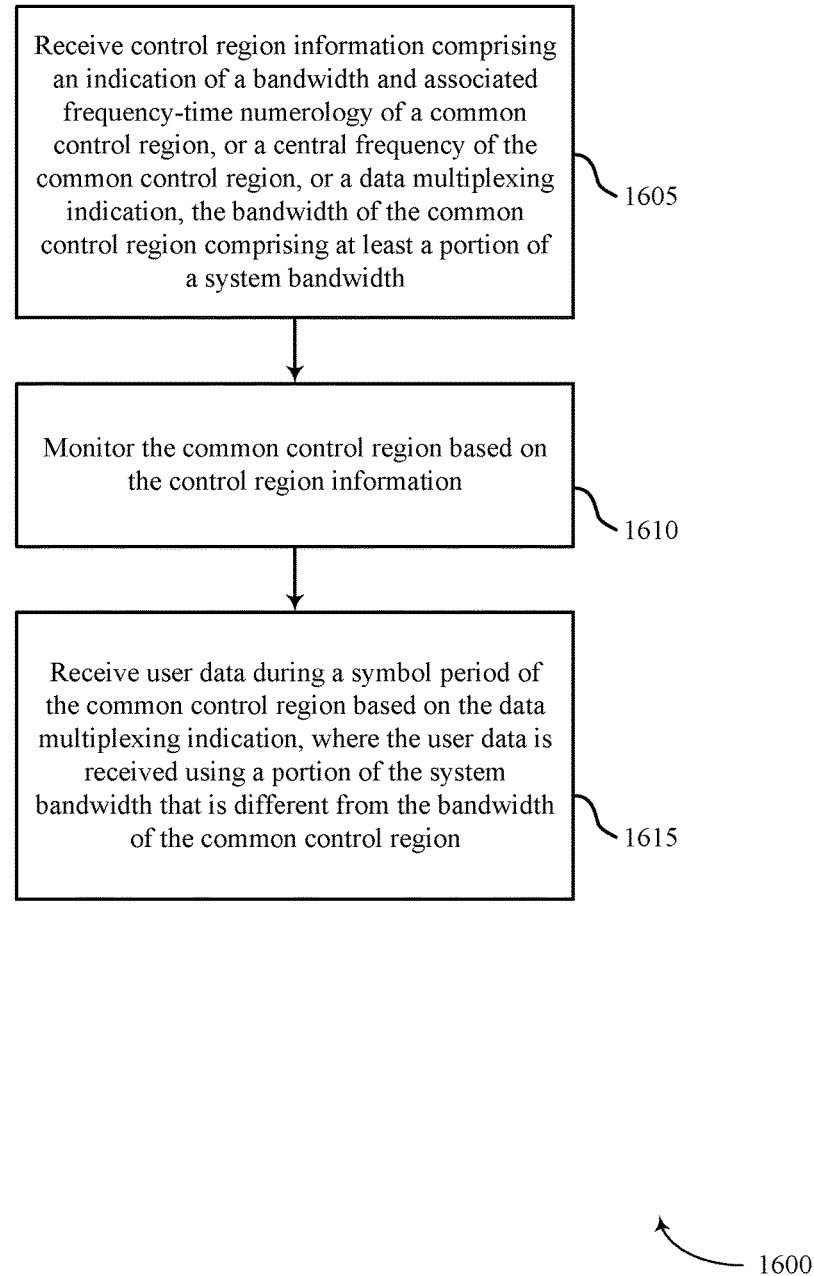

FIG. 16 shows a flowchart illustrating a method 1600 for narrowband CCCH subband design and signaling in accordance with various aspects of the present disclosure. The operations of method 1600 may be implemented by a device such as a UE 115 or its components as described with reference to FIGS. 1 and 2. For example, the operations of method 1600 may be performed by the narrowband control region manager as described herein. In some examples, the UE 115 may execute a set of codes to control the functional elements of the device to perform the functions described below. Additionally or alternatively, the UE 115 may perform aspects the functions described below using special-purpose hardware.

At block 1605, the UE 115 may receive control region information comprising an indication of a bandwidth and associated frequency-time numerology of a common control region, or a central frequency of the common control region, or a data multiplexing indication, the bandwidth of the common control region comprising at least a portion of a system bandwidth as described above with reference to FIGS. 2 through 6. In certain examples, the operations of block 1605 may be performed by the control region information component as described with reference to FIGS. 8 and 9.

At block 1610, the UE 115 may monitor the common control region based on the control region information as described above with reference to FIGS. 2 through 6. In certain examples, the operations of block 1610 may be performed by the control region monitoring component as described with reference to FIGS. 8 and 9.

At block 1615, the UE 115 may receive user data during a symbol period of the common control region based on the data multiplexing indication, where the user data is received using a different portion of the system bandwidth from the bandwidth of the common control region as described above with reference to FIGS. 2 through 6. In certain examples, the operations of block 1615 may be performed by the data multiplexing component as described with reference to FIGS. 8 and 9.

Figure 17:
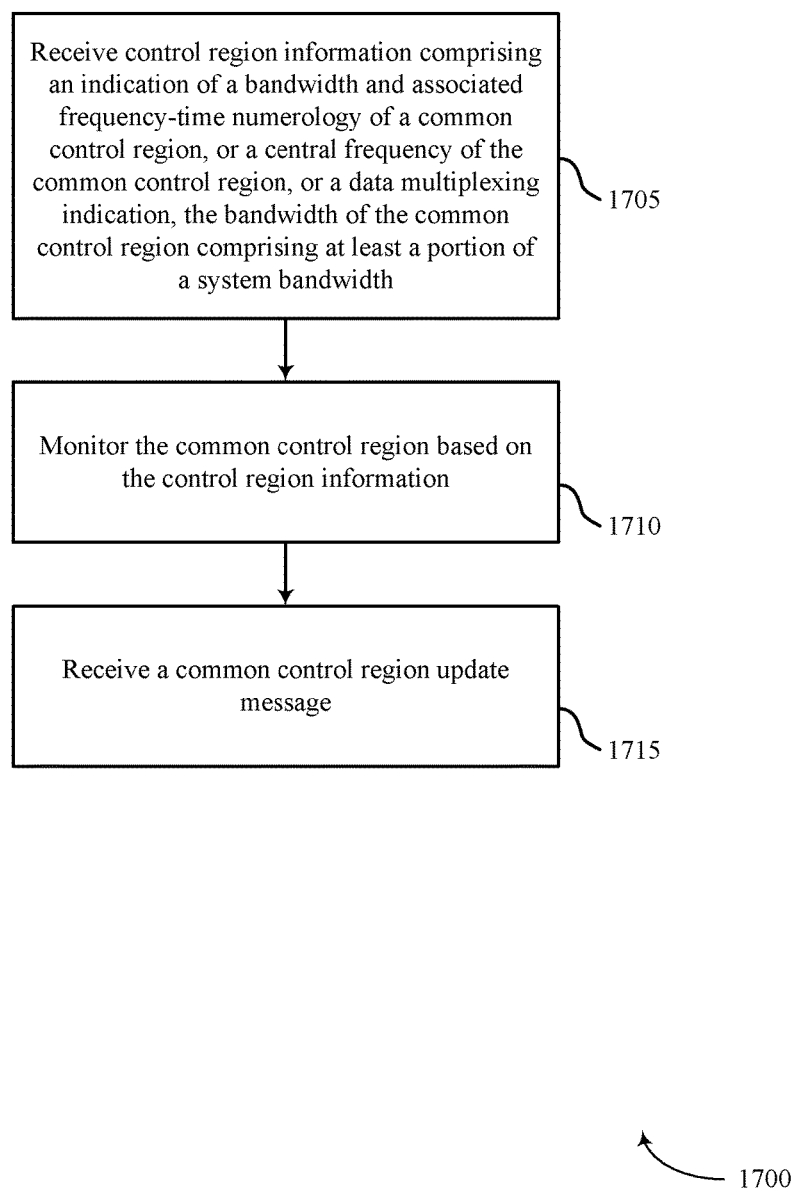

FIG. 17 shows a flowchart illustrating a method 1700 for narrowband CCCH subband design and signaling in accordance with various aspects of the present disclosure. The operations of method 1700 may be implemented by a device such as a UE 115 or its components as described with reference to FIGS. 1 and 2. For example, the operations of method 1700 may be performed by the narrowband control region manager as described herein. In some examples, the UE 115 may execute a set of codes to control the functional elements of the device to perform the functions described below. Additionally or alternatively, the UE 115 may perform aspects the functions described below using special-purpose hardware.

At block 1705, the UE 115 may receive control region information comprising an indication of a bandwidth and associated frequency-time numerology of a common control region, or a central frequency of the common control region, or a data multiplexing indication, the bandwidth of the common control region comprising at least a portion of a system bandwidth as described above with reference to FIGS. 2 through 6. In certain examples, the operations of block 1705 may be performed by the control region information component as described with reference to FIGS. 8 and 9.

At block 1710, the UE 115 may monitor the common control region based on the control region information as described above with reference to FIGS. 2 through 6. In certain examples, the operations of block 1710 may be performed by the control region monitoring component as described with reference to FIGS. 8 and 9.

At block 1715, the UE 115 may receive a common control region update message as described above with reference to FIGS. 2 through 6. In certain examples, the operations of block 1715 may be performed by the control region update component as described with reference to FIGS. 8 and 9.

Figure 18:
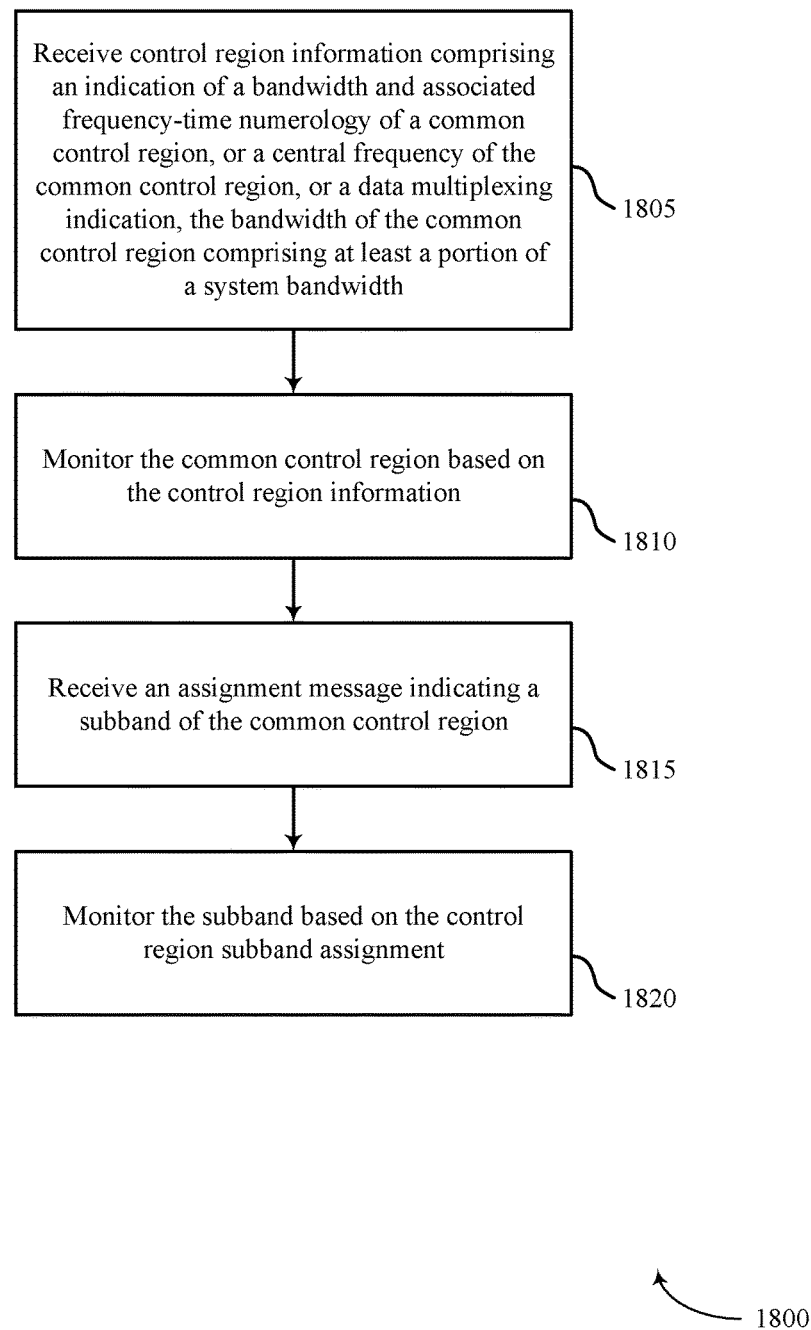

FIG. 18 shows a flowchart illustrating a method 1800 for narrowband CCCH subband design and signaling in accordance with various aspects of the present disclosure. The operations of method 1800 may be implemented by a device such as a UE 115 or its components as described with reference to FIGS. 1 and 2. For example, the operations of method 1800 may be performed by the narrowband control region manager as described herein. In some examples, the UE 115 may execute a set of codes to control the functional elements of the device to perform the functions described below. Additionally or alternatively, the UE 115 may perform aspects the functions described below using special-purpose hardware.

At block 1805, the UE 115 may receive control region information comprising an indication and associated frequency-time numerology of a bandwidth of a common control region, or a central frequency of the common control region, or a data multiplexing indication, the bandwidth of the common control region comprising at least a portion of a system bandwidth as described above with reference to FIGS. 2 through 6. In certain examples, the operations of block 1805 may be performed by the control region information component as described with reference to FIGS. 8 and 9.

At block 1810, the UE 115 may monitor the common control region based on the control region information as described above with reference to FIGS. 2 through 6. In certain examples, the operations of block 1810 may be performed by the control region monitoring component as described with reference to FIGS. 8 and 9.

At block 1815, the UE 115 may receive an assignment message indicating a subband of the common control region as described above with reference to FIGS. 2 through 6. In certain examples, the operations of block 1815 may be performed by the subband monitoring component as described with reference to FIGS. 8 and 9.

At block 1820, the UE 115 may monitor the subband based on the assignment message as described above with reference to FIGS. 2 through 6. In certain examples, the operations of block 1820 may be performed by the subband monitoring component as described with reference to FIGS. 8 and 9.

Figure 19:
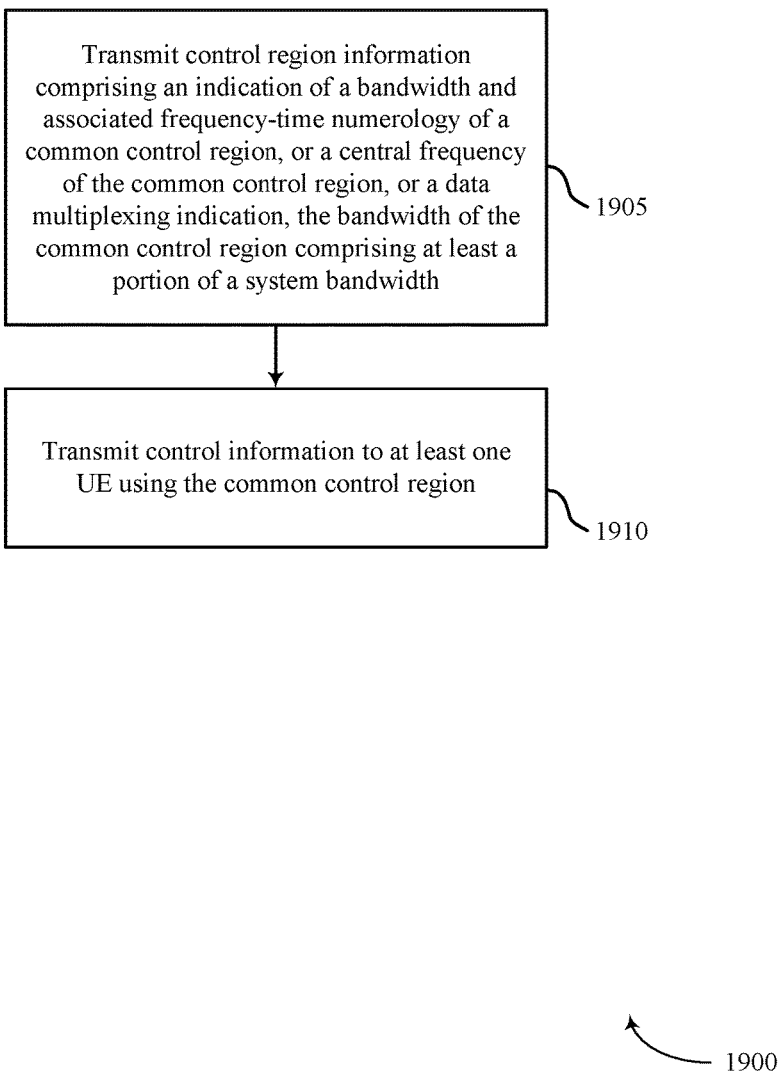

FIG. 19 shows a flowchart illustrating a method 1900 for narrowband CCCH subband design and signaling in accordance with various aspects of the present disclosure. The operations of method 1900 may be implemented by a device such as a base station 105 or its components as described with reference to FIGS. 1 and 2. For example, the operations of method 1900 may be performed by the base station narrowband control region manager as described herein. In some examples, the base station 105 may execute a set of codes to control the functional elements of the device to perform the functions described below. Additionally or alternatively, the base station 105 may perform aspects the functions described below using special-purpose hardware.

At block 1905, the base station 105 may transmit control region information comprising an indication of a bandwidth and associated frequency-time numerology of a common control region, or a central frequency of the common control region, or a data multiplexing indication, the bandwidth of the common control region comprising at least a portion of a system bandwidth as described above with reference to FIGS. 2 through 6. In certain examples, the operations of block 1905 may be performed by the control region information component as described with reference to FIGS. 12 and 13.

At block 1910, the base station 105 may transmit control information to at least one UE using the common control region as described above with reference to FIGS. 2 through 6. In certain examples, the operations of block 1910 may be performed by the control information component as described with reference to FIGS. 12 and 13.

It should be noted that these methods describe possible implementation, and that the operations and the operations may be rearranged or otherwise modified such that other implementations are possible. In some examples, aspects from two or more of the methods may be combined. For example, aspects of each of the methods may include operations or aspects of the other methods, or other operations or techniques described herein. Thus, aspects of the disclosure may provide for narrowband CCCH subband design and signaling.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or CC associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

The DL transmissions described herein may also be called forward link transmissions while the UL transmissions may also be called reverse link transmissions. Each communication link described herein including, for example, wireless communication system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using FDD (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for narrowband CCCH subband design and signaling. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
receiving control region information comprising an indication of a bandwidth and associated frequency-time numerology of a common control region, a data multiplexing indication, and an indication of a user equipment (UE) specific subband of the common control region, the bandwidth of the common control region comprising at least a portion of a system bandwidth;
receiving user data based at least in part on the data multiplexing indication, wherein the user data is received using a different portion of the system bandwidth from the bandwidth of the common control region and the UE specific subband; and
monitoring the common control region based at least in part on the control region information.

2. The method of claim 1, wherein receiving control region information comprises:
receiving an indication that a bandwidth associated with the UE is narrower than the system bandwidth.

3. The method of claim 1, further comprising:
receiving the user data during a symbol period of the common control region based at least in part on the data multiplexing indication.

4. The method of claim 3, wherein the symbol period comprises a first symbol period, a second symbol period, a third symbol period, or a fourth symbol period of a subframe and wherein the different portion of the system bandwidth comprises a bandwidth narrower than the bandwidth of the common control region.

5. The method of claim 1, wherein the control region information is received in a broadcast message or a common control channel (CCCH).

6. The method of claim 1, further comprising:
receiving a common control region update message.

7. The method of claim 6, wherein the common control region update message is received using a UE specific control channel or a radio resource control (RRC) configuration message.

8. The method of claim 1, wherein monitoring the common control region comprises:
monitoring an anchor subband of the common control region.

9. The method of claim 8, wherein the control region information comprises a location of the anchor subband.

10. The method of claim 8, wherein the control region information comprises an indication of a number of control region subbands, a bandwidth for each of the number of control region subbands, a frequency for each of the number of control region subbands, or any combination thereof.

11. The method of claim 1, further comprising:
receiving an assignment message indicating the subband of the common control region; and
monitoring the subband based at least in part on the assignment message.

12. A method of wireless communication comprising:
transmitting control region information comprising an indication of a bandwidth and associated frequency-time numerology of a common control region, a data multiplexing indication, and an indication of a user equipment (UE) specific subband of the common control region, the bandwidth of the common control region comprising at least a portion of a system bandwidth;
transmitting user data based at least in part on the data multiplexing indication, wherein the user data is transmitted using a different portion of the system bandwidth from the bandwidth of the common control region; and
transmitting control information to at least one UE using the common control region.

13. The method of claim 12, wherein transmitting control region information comprises:
transmitting an indication that a bandwidth associated with the at least one UE is narrower than the system bandwidth.

14. The method of claim 12, further comprising:
transmitting the user data to the at least one UE during a symbol period of the common control region based at least in part on the data multiplexing indication.

15. The method of claim 14, wherein the symbol period comprises a first symbol period, a second symbol period, a third symbol period, or a fourth symbol period of a subframe and wherein the different portion of the system bandwidth comprises a bandwidth narrower than the bandwidth of the common control region.

16. The method of claim 12, wherein the control region information is transmitted in a broadcast message or a common control channel (CCCH).

17. The method of claim 12, further comprising:
transmitting a common control region update message to the at least one UE.

18. The method of claim 17, wherein the common control region update message is transmitted using a UE specific control channel or a radio resource control (RRC) configuration message.

19. The method of claim 12, wherein the control information is transmitted using an anchor subband of the common control region.

20. The method of claim 19, wherein the control region information comprises a location of the anchor subband.

21. The method of claim 19, wherein the control region information comprises an indication of a number of control region subbands, a bandwidth for each of the number of control region subbands, a frequency for each of the number of control region subbands, or any combination thereof.

22. The method of claim 12, further comprising:
transmitting a subband assignment message indicating the subband of the common control region, wherein the control information is transmitted using the subband.

23. An apparatus for wireless communication, comprising:
a processor;
memory in electronic communication with the processor; and
instructions stored in the memory and operable, when executed by the processor, to cause the apparatus to:
receive control region information comprising an indication of a bandwidth and associated frequency-time numerology of a common control region, a data multiplexing indication, and an indication of a user equipment (UE) specific subband of the common control region, the bandwidth of the common control region comprising at least a portion of a system bandwidth;
receive user data based at least in part on the data multiplexing indication, wherein the user data is received using a different portion of the system bandwidth from the bandwidth of the common control region and the UE specific subband; and
monitor the common control region based at least in part on the control region information.

24. The apparatus of claim 23, wherein the instructions are operable to cause the processor to:
an indication that a bandwidth associated with the UE is narrower than the system bandwidth.

25. The apparatus of claim 23, wherein the instructions are operable to cause the processor to:
receive the user data during a symbol period of the common control region based at least in part on the data multiplexing indication.

26. The apparatus of claim 23, wherein the control region information is received in a broadcast message or a common control channel (CCCH).

27. An apparatus for wireless communication, comprising:
a processor;
memory in electronic communication with the processor; and
instructions stored in the memory and operable, when executed by the processor, to cause the apparatus to:
transmit control region information comprising an indication of a bandwidth and associated frequency-time numerology of a common control region, a data multiplexing indication, and an indication of a user equipment (UE) specific subband of the common control region, the bandwidth of the common control region comprising at least a portion of a system bandwidth;
transmit user data based at least in part on the data multiplexing indication, wherein the user data is transmitted using a different portion of the system bandwidth from the bandwidth of the common control region; and
transmit control information to at least one UE using the common control region.

28. The apparatus of claim 27, wherein the instructions are operable to cause the processor to:
transmit an indication that a bandwidth associated with the at least one UE is narrower than the system bandwidth.

29. The apparatus of claim 27, wherein the instructions are operable to cause the processor to:
transmit the user data to the at least one UE during a symbol period of the common control region based at least in part on the data multiplexing indication.

30. The apparatus of claim 27, wherein the control region information is transmitted in a broadcast message or a common control channel (CCCH).

* * * * *